United States Patent
Dintenfass et al.

(10) Patent No.: US 11,412,054 B2
(45) Date of Patent: *Aug. 9, 2022

(54) SYSTEM FOR PREDICTIVE USE OF RESOURCES

(71) Applicant: Bank of America Corporation, Charlotte, NC (US)

(72) Inventors: Katherine Dintenfass, Lincoln, RI (US); Alicia C. Jones-McFadden, Fort Mill, SC (US); Matthew Hsieh, Charlotte, NC (US); Victoria L. Dravneek, Charlotte, NC (US); Cameron D. Wadley, Waxhaw, NC (US); Jason Christian Karmelek, Mendon, MA (US); Andrew Saar, Sandy Springs, GA (US); Amber J. Quitadamo, Woodstock, GA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/732,802

(22) Filed: Jan. 2, 2020

(65) Prior Publication Data

US 2020/0145506 A1 May 7, 2020

Related U.S. Application Data

(63) Continuation of application No. 15/176,262, filed on Jun. 8, 2016, now Pat. No. 10,581,988.

(51) Int. Cl.
*H04L 67/50* (2022.01)

(52) U.S. Cl.
CPC .................................. *H04L 67/22* (2013.01)

(58) Field of Classification Search
None
See application file for complete search history.

(56) References Cited

U.S. PATENT DOCUMENTS

| 5,768,633 A | 6/1998 | Allen et al. |
| 5,930,776 A | 7/1999 | Dykstra et al. |
| (Continued) | | |

FOREIGN PATENT DOCUMENTS

| JP | 2007266143 A | 10/2007 |
| KR | 1020090047614 A | 5/2009 |
| KR | 1020090105734 A | 10/2009 |

OTHER PUBLICATIONS

"Bank of America Announces New Online Banking Alerts to Increase Security and Help Customers Monitor Their Accounts", PR Newswire [New York], Mar. 8, 2006, pp. 1-3.

(Continued)

*Primary Examiner* — Nicholas Klicos
*Assistant Examiner* — Haimei Jiang
(74) *Attorney, Agent, or Firm* — Moore & Van Allen PLLC; Anup Shrinivasan Iyer

(57) ABSTRACT

Systems, computer program products, and methods are described herein for predictive use of resources across a dispersed Internet protocol capable network connecting devices electrically attached to the network. The present invention is configured to determine a resource utilization profile associated with a first user; receive an indication from the first user to improve the resource utilization profile; initiate a first user interface, wherein the first user interface comprises one or more target resource utilization profiles associated with one or more users; receive a first user selection of a target resource utilization profile associated with the resource utilization profile that the first user wishes to change; determine one or more access paths associated with the at least one target resource utilization profile; and (Continued)

display on the first user computing device the one or more access paths to enable the first user to achieve the at least one target utilization profile.

20 Claims, 5 Drawing Sheets

(56) References Cited

U.S. PATENT DOCUMENTS

| | | | |
|---|---|---|---|
| 6,202,055 B1 | 3/2001 | Houvener et al. |
| 6,327,677 B1 | 12/2001 | Garg et al. |
| 6,522,772 B1 | 2/2003 | Morrison et al. |
| 6,533,392 B1 | 3/2003 | Koitabashi |
| 6,636,249 B1 | 10/2003 | Rekimoto |
| 6,658,393 B1 | 12/2003 | Basch et al. |
| 6,674,993 B1 | 1/2004 | Tarbouriech |
| 6,764,003 B1 | 7/2004 | Martschitsch et al. |
| 6,856,965 B1 | 2/2005 | Stinson et al. |
| 7,016,532 B2 | 3/2006 | Boncyk et al. |
| 7,062,454 B1 | 6/2006 | Giannini et al. |
| 7,082,463 B1 | 7/2006 | Bradley et al. |
| 7,110,964 B2 | 9/2006 | Tengler et al. |
| 7,154,529 B2 | 12/2006 | Hoke et al. |
| 7,155,228 B2 | 12/2006 | Rappaport et al. |
| 7,309,015 B2 | 12/2007 | Frantz et al. |
| 7,403,652 B2 | 7/2008 | Boncyk et al. |
| 7,412,081 B2 | 8/2008 | Doi |
| 7,424,303 B2 | 9/2008 | Al-Sarawi |
| 7,477,780 B2 | 1/2009 | Boncyk et al. |
| 7,509,279 B2 | 3/2009 | Chhabra et al. |
| 7,526,280 B2 | 4/2009 | Jung et al. |
| 7,539,752 B1 | 5/2009 | Chakravarti et al. |
| 7,548,884 B1 | 6/2009 | Thomas |
| 7,564,469 B2 | 7/2009 | Cohen |
| 7,565,008 B2 | 7/2009 | Boncyk et al. |
| 7,568,045 B1 | 7/2009 | Agrawal |
| 7,607,570 B1 | 10/2009 | Constantine |
| 7,615,446 B2 | 11/2009 | Kim et al. |
| 7,634,448 B1 | 12/2009 | Ramachandran |
| 7,650,376 B1 | 1/2010 | Blumenau |
| 7,653,597 B1 | 1/2010 | Stevanovski et al. |
| 7,668,777 B2 | 2/2010 | White et al. |
| 7,680,324 B2 | 3/2010 | Boncyk et al. |
| 7,693,585 B2 | 4/2010 | Kalan et al. |
| 7,721,954 B1 | 5/2010 | Karamian et al. |
| 7,734,539 B2 | 6/2010 | Ghosh et al. |
| 7,735,728 B2 | 6/2010 | Wallerstorfer |
| 7,742,991 B2 | 6/2010 | Salzmann et al. |
| 7,775,437 B2 | 8/2010 | Cohen |
| 7,792,738 B2 | 9/2010 | Channell |
| 7,827,099 B1 | 11/2010 | Cotton |
| 7,831,471 B2 | 11/2010 | Adams |
| 7,840,031 B2 | 11/2010 | Albertson et al. |
| 7,881,243 B2 | 2/2011 | Hardy et al. |
| 7,881,529 B2 | 2/2011 | Boncyk et al. |
| 7,881,994 B1 | 2/2011 | An et al. |
| 7,895,102 B1 | 2/2011 | Wilks et al. |
| 7,899,243 B2 | 3/2011 | Boncyk et al. |
| 7,899,252 B2 | 3/2011 | Boncyk et al. |
| 7,899,750 B1 | 3/2011 | Klieman et al. |
| 7,962,128 B2 | 6/2011 | Neven et al. |
| 7,970,649 B2 | 6/2011 | Wu |
| 7,983,971 B1 | 7/2011 | McLuckie et al. |
| 7,988,060 B2 | 8/2011 | Killian et al. |
| 8,121,944 B2 | 2/2012 | Norman et al. |
| 8,138,930 B1 | 3/2012 | Heath |
| 8,145,594 B2 | 3/2012 | Geisner et al. |
| 8,154,428 B2 | 4/2012 | Do et al. |
| 8,180,377 B2 | 5/2012 | Yang et al. |
| 8,190,502 B2 | 5/2012 | Moran et al. |
| 8,195,551 B2 | 6/2012 | Moore et al. |
| 8,233,673 B2 | 7/2012 | Britz et al. |
| 8,275,685 B2 | 9/2012 | Ross et al. |
| 8,335,741 B2 | 12/2012 | Kornegay et al. |
| 8,385,971 B2 | 2/2013 | Rhoads et al. |
| 8,387,861 B2 | 3/2013 | Constantine |
| 8,392,450 B2 | 3/2013 | Blanchflower et al. |
| 8,423,452 B1 | 4/2013 | Ley et al. |
| 8,423,469 B2 | 4/2013 | Marlow et al. |
| 8,433,631 B1 | 4/2013 | An et al. |
| 8,433,650 B1 | 4/2013 | Thomas |
| 8,438,110 B2 | 5/2013 | Calman et al. |
| 8,442,906 B1 | 5/2013 | Thomas |
| 8,447,689 B2 | 5/2013 | Ghosh et al. |
| 8,566,197 B2 | 10/2013 | Satyavolu et al. |
| 8,571,888 B2 | 10/2013 | Calman et al. |
| 8,600,857 B2 | 12/2013 | Satyavolu et al. |
| 8,622,287 B2 | 1/2014 | Constantine |
| 8,645,971 B2 | 2/2014 | Carlson et al. |
| 8,650,105 B2 | 2/2014 | Satyavolu et al. |
| 8,718,612 B2 | 5/2014 | Calman et al. |
| 8,730,243 B2 | 5/2014 | Wenholz et al. |
| 8,744,946 B2 | 6/2014 | Shelton |
| 8,898,087 B1 | 11/2014 | Salzmann et al. |
| 8,966,578 B1 | 2/2015 | Belov et al. |
| 9,147,117 B1* | 9/2015 | Madhu ............... G06K 9/00979 |
| 9,196,007 B1 | 11/2015 | Thomas |
| 9,727,910 B1* | 8/2017 | Wu ........................ G06Q 40/02 |
| 9,774,586 B1 | 9/2017 | Roche et al. |
| 2002/0029386 A1 | 3/2002 | Robbins |
| 2002/0095363 A1 | 7/2002 | Sloan et al. |
| 2002/0124188 A1 | 9/2002 | Sherman et al. |
| 2002/0138418 A1 | 9/2002 | Zarin et al. |
| 2002/0198822 A1 | 12/2002 | Munoz et al. |
| 2003/0064705 A1 | 4/2003 | Desiderio |
| 2003/0083957 A1 | 5/2003 | Olefson |
| 2004/0021584 A1 | 2/2004 | Hartz, Jr. et al. |
| 2004/0024709 A1 | 2/2004 | Yu et al. |
| 2004/0049402 A1 | 3/2004 | Dojo et al. |
| 2004/0068751 A1 | 4/2004 | Basawapatna et al. |
| 2004/0128508 A1 | 7/2004 | Wheeler et al. |
| 2004/0177030 A1 | 9/2004 | Shoham |
| 2004/0186807 A1 | 9/2004 | Nathans et al. |
| 2005/0010506 A1 | 1/2005 | Bachann |
| 2005/0149437 A1 | 7/2005 | Zellner et al. |
| 2005/0162523 A1 | 7/2005 | Darrell et al. |
| 2005/0165684 A1 | 7/2005 | Jensen et al. |
| 2005/0177501 A1 | 8/2005 | Thomas |
| 2005/0187860 A1 | 8/2005 | Peterson et al. |
| 2005/0240670 A1 | 10/2005 | Cheng |
| 2005/0273430 A1 | 12/2005 | Pliha |
| 2006/0095351 A1 | 5/2006 | Gershenfeld et al. |
| 2006/0100951 A1 | 5/2006 | Mylet et al. |
| 2006/0161487 A1 | 7/2006 | Saxena et al. |
| 2006/0242047 A1 | 10/2006 | Haggerty et al. |
| 2007/0100749 A1 | 5/2007 | Bachu et al. |
| 2007/0106558 A1* | 5/2007 | Mitchell ............... G06Q 20/047 |
| | | | 705/16 |
| 2007/0140595 A1 | 6/2007 | Taylor et al. |
| 2007/0156554 A1 | 7/2007 | Nikoley et al. |
| 2007/0162971 A1 | 7/2007 | Blom et al. |
| 2007/0240186 A1 | 10/2007 | Silver et al. |
| 2007/0279521 A1 | 12/2007 | Cohen |
| 2007/0288373 A1 | 12/2007 | Wilkes |
| 2008/0018340 A1 | 1/2008 | Amou et al. |
| 2008/0021803 A1 | 1/2008 | Ahles et al. |
| 2008/0040278 A1 | 2/2008 | DeWitt |
| 2008/0070198 A1 | 3/2008 | Dempsey |
| 2008/0120133 A1 | 5/2008 | Krishnaswami et al. |
| 2008/0195745 A1 | 8/2008 | Bowra et al. |
| 2008/0214210 A1* | 9/2008 | Rasanen ............... H04W 4/029 |
| | | | 455/456.3 |
| 2008/0243721 A1 | 10/2008 | Joao |
| 2008/0267447 A1 | 10/2008 | Kelusky et al. |
| 2008/0268876 A1 | 10/2008 | Gelfand et al. |
| 2009/0006191 A1 | 1/2009 | Arankalle et al. |
| 2009/0061949 A1 | 3/2009 | Chen |
| 2009/0089131 A1 | 4/2009 | Moukas et al. |
| 2009/0094125 A1 | 4/2009 | Killian et al. |
| 2009/0102859 A1 | 4/2009 | Athsani et al. |
| 2009/0121271 A1 | 5/2009 | Son et al. |
| 2009/0140839 A1 | 6/2009 | Bishop et al. |
| 2009/0144164 A1 | 6/2009 | Wane et al. |
| 2009/0171850 A1 | 7/2009 | Yuval |

(56) References Cited

U.S. PATENT DOCUMENTS

| | | | |
|---|---|---|---|
| 2009/0182748 A1 | 7/2009 | Walker | |
| 2009/0204511 A1 | 8/2009 | Tsang | |
| 2009/0237546 A1 | 9/2009 | Bloebaum et al. | |
| 2009/0250515 A1 | 10/2009 | Todd et al. | |
| 2009/0251963 A1 | 10/2009 | Seol et al. | |
| 2009/0271313 A1 | 10/2009 | Chaudhari et al. | |
| 2010/0002204 A1 | 1/2010 | Jung et al. | |
| 2010/0024019 A1 | 1/2010 | Backlund | |
| 2010/0103241 A1 | 4/2010 | Linaker | |
| 2010/0130226 A1 | 5/2010 | Arrasvuori et al. | |
| 2010/0185529 A1 | 7/2010 | Chesnut et al. | |
| 2010/0228776 A1 | 9/2010 | Melkote et al. | |
| 2010/0250581 A1 | 9/2010 | Chau | |
| 2010/0255795 A1 | 10/2010 | Rubinsky et al. | |
| 2010/0274691 A1 | 10/2010 | Hammad et al. | |
| 2010/0277412 A1 | 11/2010 | Pryor | |
| 2010/0280935 A1* | 11/2010 | Fellowes | G06Q 40/00 705/35 |
| 2010/0281432 A1 | 11/2010 | Geisner et al. | |
| 2010/0289643 A1 | 11/2010 | Trundle et al. | |
| 2010/0306712 A1 | 12/2010 | Snook et al. | |
| 2010/0306715 A1 | 12/2010 | Geisner et al. | |
| 2011/0022540 A1 | 1/2011 | Stern et al. | |
| 2011/0034176 A1 | 2/2011 | Lord et al. | |
| 2011/0047075 A1 | 2/2011 | Fourez | |
| 2011/0077046 A1 | 3/2011 | Durand et al. | |
| 2011/0079639 A1 | 4/2011 | Khan | |
| 2011/0106622 A1 | 5/2011 | Kuhlman et al. | |
| 2011/0119155 A1 | 5/2011 | Hammad et al. | |
| 2011/0202460 A1 | 8/2011 | Buer et al. | |
| 2011/0202466 A1 | 8/2011 | Carter | |
| 2011/0295731 A1* | 12/2011 | Waldron, III | G06Q 10/0635 705/35 |
| 2011/0320607 A1 | 12/2011 | Harrang et al. | |
| 2012/0100915 A1 | 4/2012 | Margalit et al. | |
| 2012/0173869 A1 | 7/2012 | Stinson, III et al. | |
| 2012/0233670 A1 | 9/2012 | Bonnes et al. | |
| 2012/0330753 A1 | 12/2012 | Urbanski et al. | |
| 2013/0011111 A1 | 1/2013 | Abraham et al. | |
| 2013/0102283 A1 | 4/2013 | Lau et al. | |
| 2013/0167035 A1 | 6/2013 | Imes et al. | |
| 2014/0075575 A1 | 3/2014 | Kim et al. | |
| 2014/0113600 A1 | 4/2014 | El Gamal et al. | |
| 2014/0337930 A1 | 11/2014 | Hoyos et al. | |
| 2014/0351924 A1 | 11/2014 | Myers | |
| 2015/0127165 A1 | 5/2015 | Quam et al. | |
| 2015/0281303 A1 | 10/2015 | Yousef et al. | |
| 2016/0029291 A1 | 1/2016 | Khaul et al. | |
| 2016/0034932 A1* | 2/2016 | Sion | G06Q 20/384 705/14.1 |
| 2016/0125412 A1* | 5/2016 | Cannon | G06Q 20/4014 705/44 |
| 2016/0285704 A1 | 9/2016 | Gasparakis et al. | |
| 2016/0380883 A1 | 12/2016 | Shaw et al. | |
| 2017/0359229 A1* | 12/2017 | Dintenfass | H04L 67/22 |
| 2018/0041788 A1 | 2/2018 | Wang | |

OTHER PUBLICATIONS

"Landware: Pocket Quicken: Now it's easy to keep your financial information complete, accurate and up-to-date wherever you go", http://www.landware.com/pocketquicken/moreinfo.html, copyright 1995-2007, pp. 1-4.

A. Kaklauskas and M. Gikys, Increasing Efficiency of Multiple Listing Service Systems Applying Web-Based Decision Support System for Real Estate, Journal of Civil Engineering and Management, 2005, vol. XI, No. 2, pp. 91-97, http://citeseerx.ist.psu.edu/viewdoc/summary?doi=10.1.1.125.7011.

Anonymous, "NewsRx: Intuit Inc.; The New Free Quicken Online: the Web's First Forward-Looking Personal Finance Service", Science Letter, Dec. 23, 2008, pp. 1-2.

Brokers cautioned about overreliance on credit scoring; La Monica, Paul R. American Banker [New York, N.Y] Jun. 26, 1997: 11:1.

Chinese Office Action dated Apr. 26, 2011, Chinese Patent Application 200880022066.3, 18 pages.

Copyright Phillips Business Information, Inc.; Credit Risk Management Report, v9, n3, pNA; Feb. 22, 1999.

Credit cards could have no limits [Transaction would not work unless funds were previously transferred into credit card bank account], Boufford, John, ComputerWorld Canada, North York; Oct. 20, 2000, vol. 16, Iss. 21; http://proquestumic.om/pgdweb?index=27&sid=4&srchmode=1&vinst-PROD&fmt=3&st..., downloaded Sep. 6, 2011, 2 pages.

E3 Corp. Acquires Market Data Solutions, Inc. and eMillenium, Inc. to Take Demand-based Inventory Forecasting to the Next Level, PR Newswire, New York, Apr. 17, 2000, http://proquestumic.om/pgdweb?index=0&sid=6&srchmode=1&vinst-PROD&fmt=3&st..., downloaded Sep. 6, 2011, 3 pages.

European Search Report, Application No. 11167182.2-1238, dated Oct. 11, 2019, 8 pages.

International Preliminary Examination Report for International Application No. PCT/US12/27892 dated Sep. 10, 2013; 9 pages.

International Preliminary Examination Report for International Application No. PCT/US12/27912 dated Sep. 10, 2013; 6 pages.

International Preliminary Examination Report for International Application No. PCT/US12/28008 dated Sep. 10, 2013; 7 pages.

International Preliminary Examination Report for International Application No. PCT/US12/28036 dated Sep. 10, 2013; 5 pages.

International Search Report and Written Opinion for International Application No. PCT/US12/27890 dated Feb. 5, 2013.

International Searching Authority. PCT International Search Report and Written Opinion dated Jun. 14, 2012. PCT International Application No. PCT/US12/27892. Name of Applicant: Bank of America Corporation. English Language. 19 pages.

International Searching Authority. PCT International Search Report and Written Opinion dated Jun. 8, 2012. PCT International Application No. PCT/US2012/027912. Name of Applicant: Bank of America Corporation. English Language. 12 pages.

International Searching Authority. PCT International Search Report and Written Opinion dated May 22, 2012. PCT International Application No. PCT/US12/28008. Name of Applicant: Bank of America Corporation. English Language. 13 pages.

International Searching Authority. PCT International Search Report and Written Opinion dated May 28, 2012. PCT International Application No. PCT/US12/28036. Name of Applicant: Bank of America Corporation. English Language. 11 pages.

K.J. Jeevan & P. Padhi (2006). A Selective Review of Research in Content Personalization. Library Review, 55(9), 556-586. doi:http://dx.doi.org/10.1108/00242530610706761.

Kelly J. Andrews, Target Marketing, v. 23, n. 1, p. 22—Jan. 2000.

Lengyel, Zoltan, International Financial Law Review, v19n5 PP; 73; May 2000, ISSN 0262-69689, JRNL Code: IFL.

M.J. Welch (2010). Addressing the Challenges in Underspecification in Web Search. (Order No. 3446833, University of California, Los Angeles). ProQuest Dissertations and Theses; 137; retrieved from http://search.proquest.com/docview/858101500?accountid=14753. (858101500).

New Zealand Patent Office Examination Report, Patent Application No. 580698, dated Apr. 13, 2011, 3 pages.

Open Spending, https://openspending.org, 5 pages.

P.A. Lissner (2007). Chi-thinking: Chiasmus and Cognition. (Order No. 3297307, University of Maryland, College Park). ProQuest Dissertations and Theses; 487; retrieved from http://search.proquest.com/docview/304851937?accountid=14753. (304851937).

PCT International Preliminary Reporton Patentability, PCT/US2008/061425, dated Oct. 27, 2009, 6 pages.

Scientific and Technical Information Center; EIC 3600 Search Results, pp. 1-89, Nov. 4, 2009.

Secondary markets explain credit score: Taylor, Marshal. Real Estate Finance Today 13.7(Apr. 1, 1996):16.

Spouses share liability for each other's credit debts:[Morning Edition]: Edmond Sanders: The Orange County Register [Santa Ana, Calif] Mar. 30, 1998:d05.

Supplemental European Search Report, Application No. /Patent No. 08746786.6-2221/2140422 PCT/US20008061425, dated Feb. 15, 2012, 6 pages.

(56) References Cited

OTHER PUBLICATIONS

U.S. International Searching Authority. PCT International Search Report and Written Opinion dated Sep. 24, 2012. PCT International Application No. PCT/US12/48697. Name of Applicant: Bank of America Corporation. English Language. 14 pages.
Value Checking Accounts, The Business of Valuing Checking Accounts and Scoring Consumer Risk, Critical Point Group, Inc., http://www.criticalpointgroup.com/valuingchecking.html, downloaded Mar. 15, 2007, 2 pages.
Visualize-Your-Spending-With-Compass, https://www.lgfcu.org/visualize-your-spending-with-compass, 4 pages.
Xun Luo, The Cloud-Mobile Convergence Paradigm for Augmented Reality, http://cdn.intechopen.com/pdfs/24824/InTech-The_cloud_mobile_convergence_paradigm_for_augmented_reality.pdf, pp. 34-59.
International Preliminary Examination Report for International Application No. PCT/US2012/027890 dated Sep. 10, 2013; 6 pages.
International Search Report and Written Opinion for International Application No. PCT/US12/27890 dated Feb. 5, 2013, 6 pages.

\* cited by examiner

```
                                              300
```

RECEIVE, FROM A FIRST USER COMPUTING DEVICE, AN INDICATION FROM A USER TO INITIATE A CHANGE ASSOCIATED WITH A RESOURCE UTILIZATION PROFILE OF THE USER
302

INITIATE A FIRST USER INTERFACE FOR DISPLAY ON THE FIRST USER COMPUTING DEVICE
304

RECEIVE, VIA THE FIRST USER INTERFACE, A USER SELECTION OF AT LEAST ONE OF THE ONE OR MORE RESOURCES ASSOCIATED WITH THE RESOURCE UTILIZATION PROFILE THAT THE USER WISHES TO CHANGE
306

CONTINUOUSLY MONITOR THE ONE OR MORE RESOURCES ASSOCIATED WITH THE RESOURCE UTILIZATION PROFILE ACROSS THE DISPERSED NETWORK FOR A PREDETERMINED AMOUNT OF TIME SINCE THE INITIATION OF THE CHANGE BY THE USER
308

DETERMINE A UTILIZATION TREND ASSOCIATED WITH THE RESOURCE UTILIZATION PROFILE OF THE USER
310

DYNAMICALLY GENERATE A GRAPHICAL REPRESENTATION OF THE UTILIZATION TREND
312

TRANSMIT CONTROL SIGNALS CONFIGURED TO CAUSE THE FIRST USER COMPUTING DEVICE TO DISPLAY THE GRAPHICAL REPRESENTATION OF THE UTILIZATION TREND TO THE USER
314

FIGURE 3

SYSTEM FOR PREDICTIVE USE OF RESOURCES

CROSS-REFERENCE TO RELATED APPLICATION

This application is a continuation of and claims priority from allowed, co-pending U.S. patent application Ser. No. 15/176,262, filed on Jun. 8, 2016, and entitled "SYSTEM FOR PREDICTIVE USE OF RESOURCES".

BACKGROUND

Resource management is the efficient and effective development of an organization's resources. Most organizations strive to achieve maximum utilization of the resources weighted by important metrics and subject to predefined constraints at the smallest level of operation. Access to resources within an Internet protocol (IP) based dispersed network typically involves establishing specific access protocols to provide authorization. However, allocation of these resources based on constraints, protocols, and metrics may pose the challenge to any organization. There is a need for a system to establish one or more alternative paths to acquire resources.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for predictive use of resources across a dispersed Internet protocol capable network connecting devices electrically attached to the network is presented. The system comprising: at least one memory storing a resource prediction application; at least one processing device operatively coupled to the at least one memory, wherein the processing device is configured to execute computer-readable program code to: determine a resource utilization profile associated with a first user, wherein the resource utilization profile comprises usage statistics associated with one or more resources allocated to the user across the dispersed network; continuously monitor the resource utilization profile of the user to track the use of the one or more resources allocated to the user over a predetermine period of time; determine one or more elevated usage instances based on at least continuously monitoring the resource utilization profile of the user; predict, via the resource prediction application, that at least one of the one or more elevated usage instances is scheduled to occur; determine a first set of one or more additional resources across the dispersed network for the user for processing during the at least one of the one or more elevated usage instances; initiate, a first user interface for display on a first computing device, wherein the first user interface comprises one or more target resource utilization profiles associated with one or more users; receive, via the first user interface, a first user selection of at least one of the one or more target resource utilization profiles associated with the resource utilization profile that the first user wishes to change; determine one or more access paths associated with the at least one target resource utilization profile to enable the first user to achieve the at least one target utilization profile; and transmit, a second user interface for display on the first user computing device, wherein the second user interface comprises the one or more access paths associated with the at least one target resource utilization profile to enable the first user to achieve the at least one target utilization profile.

In some embodiments, the at least one processing device is further configured to: receive, via the second user interface, a first user selection of at least one of the one or more access paths to achieve the at least one target utilization profile; and determine one or more actions associated with the at least one of the one or more access paths to be executed by the first user to enable the first user to achieve the at least one target utilization profile.

In some embodiments, the at least one processing device is further configured to: initiate a third user interface for display on the first user computing device, wherein the third user interface comprises the one or more actions associated with the at least one of the one or more access paths; and receive, via the third user interface, a user input indicating an execution of at least one of the one or more actions by the first user associated with the at least one of the one or more access paths to achieve the at least one target utilization profile.

In some embodiments, the at least one processing device is further configured to: continuously monitor the first user computing device to determine the execution of at least one of the one or more actions by the first user associated with the at least one of the one or more access paths to achieve the at least one target utilization profile.

In some embodiments, the at least one processing device is further configured to: dynamically generate a graphical representation of the resource utilization profile of the first user reflecting a utilization of one or more resources of the first user in real-time; and transmit control signals configured to cause the first user computing device to display the graphical representation of the resource utilization profile.

In some embodiments, the at least one processing device is further configured to: determine a progress level associated with a progress of the first user towards achieving the at least one target utilization profile; and continuously update the progress level based on at least continuously monitoring the first user computing device to determine the execution of at least one of the one or more actions by the first user associated with the at least one of the one or more access paths.

In some embodiments, the at least one processing device is further configured to: determine a first user profile associated with the first user; compare the first user profile associated with the first user with the one or more user profiles associated with the one or more users to determine a match; determine the one or more target resource utilization profiles associated with one or more users based on at least determining a match between the first user profile and the one or more user profiles associated with the one or more users.

In another aspect, a computerized method for predictive use of resources across a dispersed Internet protocol capable network connecting devices electrically attached to the network is presented. The method comprising: determining, via a computing device processor, a resource utilization profile associated with a first user, wherein the resource utilization profile comprises usage statistics associated with one or more resources allocated to the user across the dispersed network; continuously monitoring, via a computing device processor, the resource utilization profile of the user to track the use of the one or more resources allocated to the user over a predetermine period of time; determining, via a computing device processor, one or more elevated usage instances based on at least continuously monitoring the resource utilization profile of the user; predicting, via a resource prediction application, that at least one of the one or more elevated usage instances is scheduled to occur; determining, via a computing device processor, a first set of one or more additional resources across the dispersed network for the user for processing during the at least one of the one or more elevated usage instances; initiating, via a computing device processor, a first user interface for display on the first computing device, wherein the first user interface comprises one or more target resource utilization profiles associated with one or more users; receiving, via the first user interface, a first user selection of at least one of the one or more target resource utilization profiles associated with the resource utilization profile that the first user wishes to change; determining, via a computing device processor, one or more access paths associated with the at least one target resource utilization profile to enable the first user to achieve the at least one target utilization profile; and transmitting, via a computing device processor, a second user interface for display on the first user computing device, wherein the second user interface comprises the one or more access paths associated with the at least one target resource utilization profile to enable the first user to achieve the at least one target utilization profile.

In yet another aspect, a computer program product for predictive use of resources across a dispersed Internet protocol capable network connecting devices electrically attached to the network is presented. The computer program product comprising a non-transitory computer-readable medium comprising code causing a first apparatus to: determine a resource utilization profile associated with a first user, wherein the resource utilization profile comprises usage statistics associated with one or more resources allocated to the user across the dispersed network; continuously monitor the resource utilization profile of the user to track the use of the one or more resources allocated to the user over a predetermine period of time; determine one or more elevated usage instances based on at least continuously monitoring the resource utilization profile of the user; predict, via a resource prediction application, that at least one of the one or more elevated usage instances is scheduled to occur; determine a first set of one or more additional resources across the dispersed network for the user for processing during the at least one of the one or more elevated usage instances; initiate, a first user interface for display on a first computing device, wherein the first user interface comprises one or more target resource utilization profiles associated with one or more users; receive, via the first user interface, a first user selection of at least one of the one or more target resource utilization profiles associated with the resource utilization profile that the first user wishes to change; determine one or more access paths associated with the at least one target resource utilization profile to enable the first user to achieve the at least one target utilization profile; and transmit, a second user interface for display on the first user computing device, wherein the second user interface comprises the one or more access paths associated with the at least one target resource utilization profile to enable the first user to achieve the at least one target utilization profile.

BRIEF DESCRIPTION OF THE DRAWINGS

Figure 1:
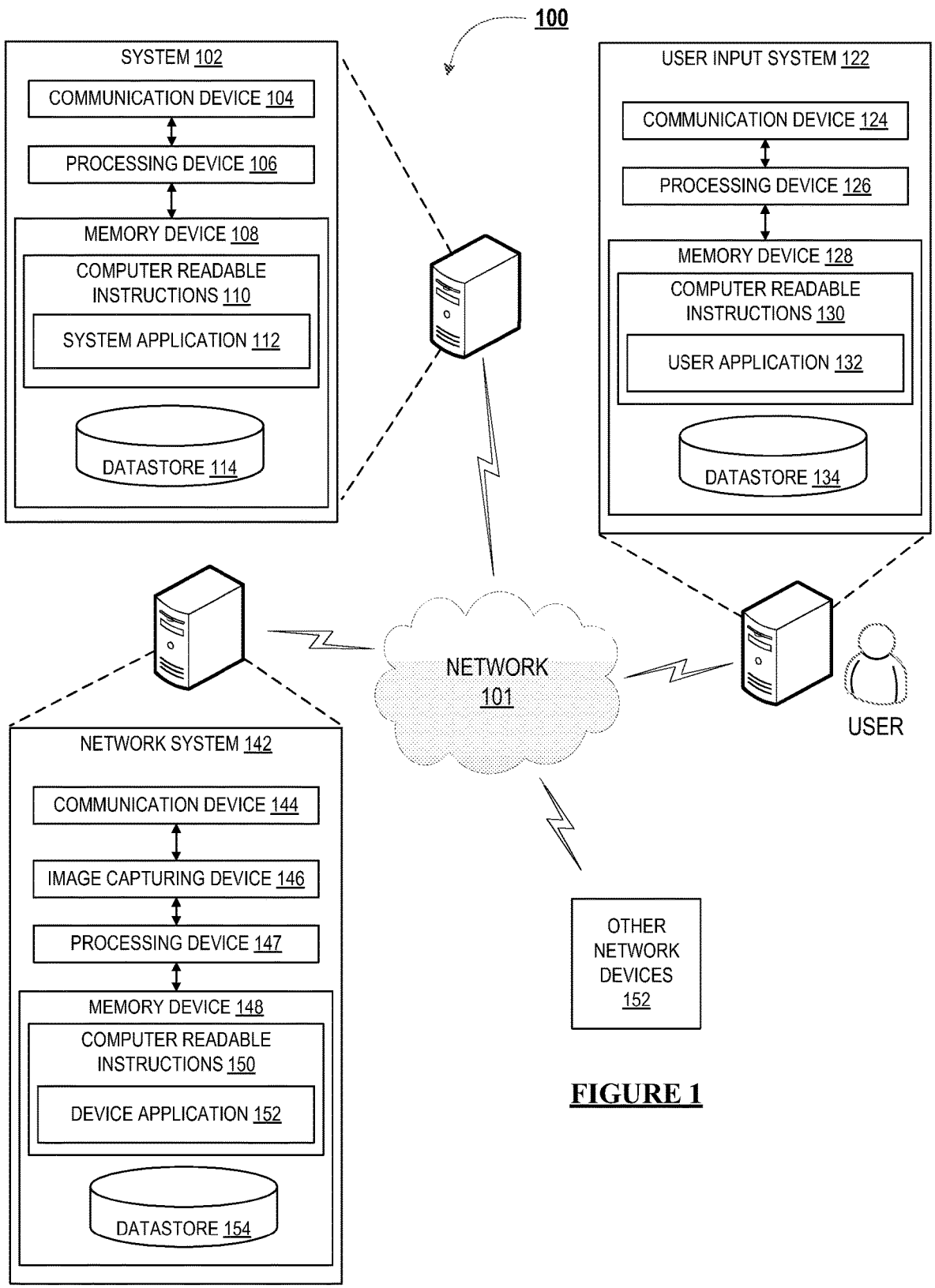
Figure 2:
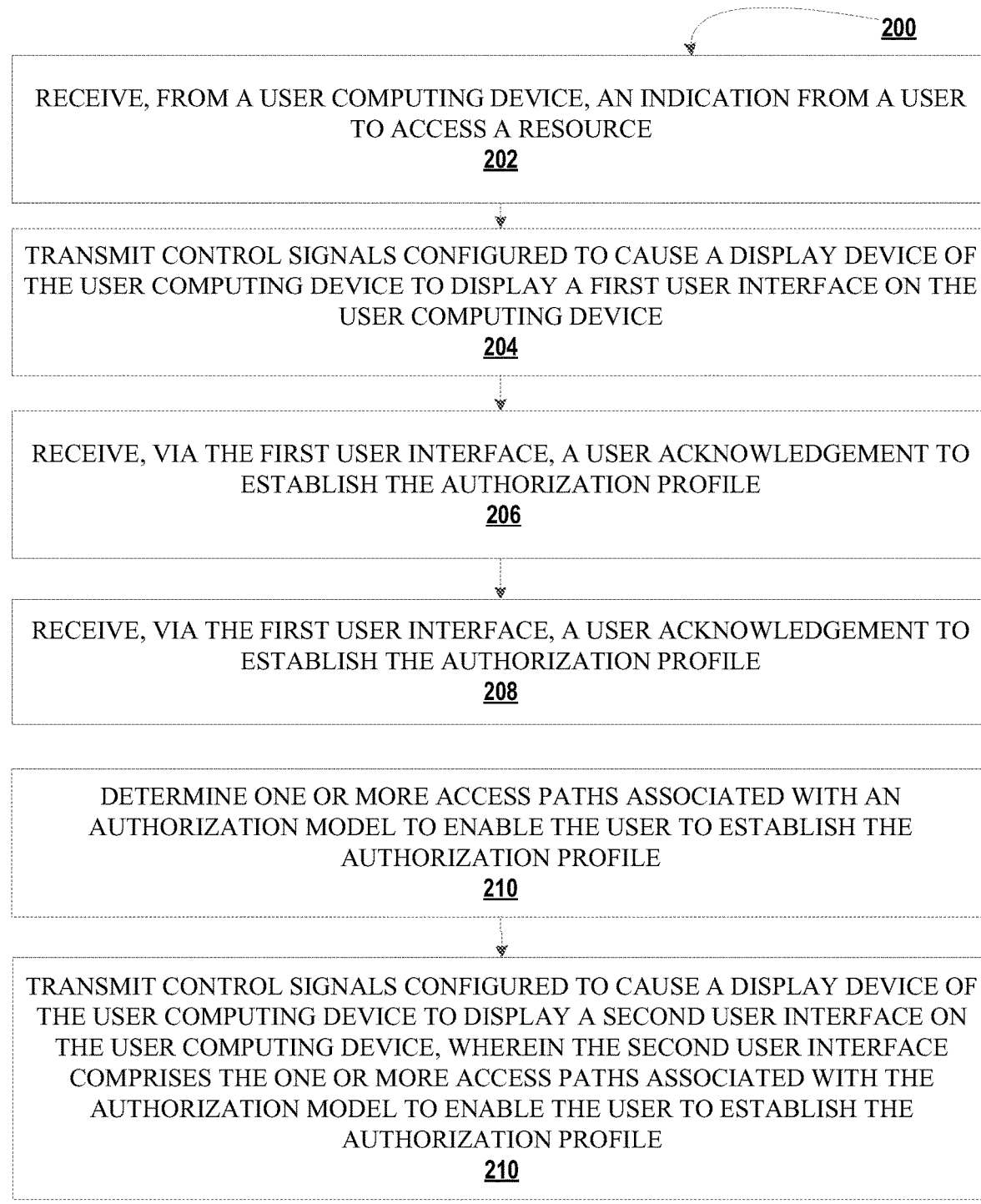
Figure 4:
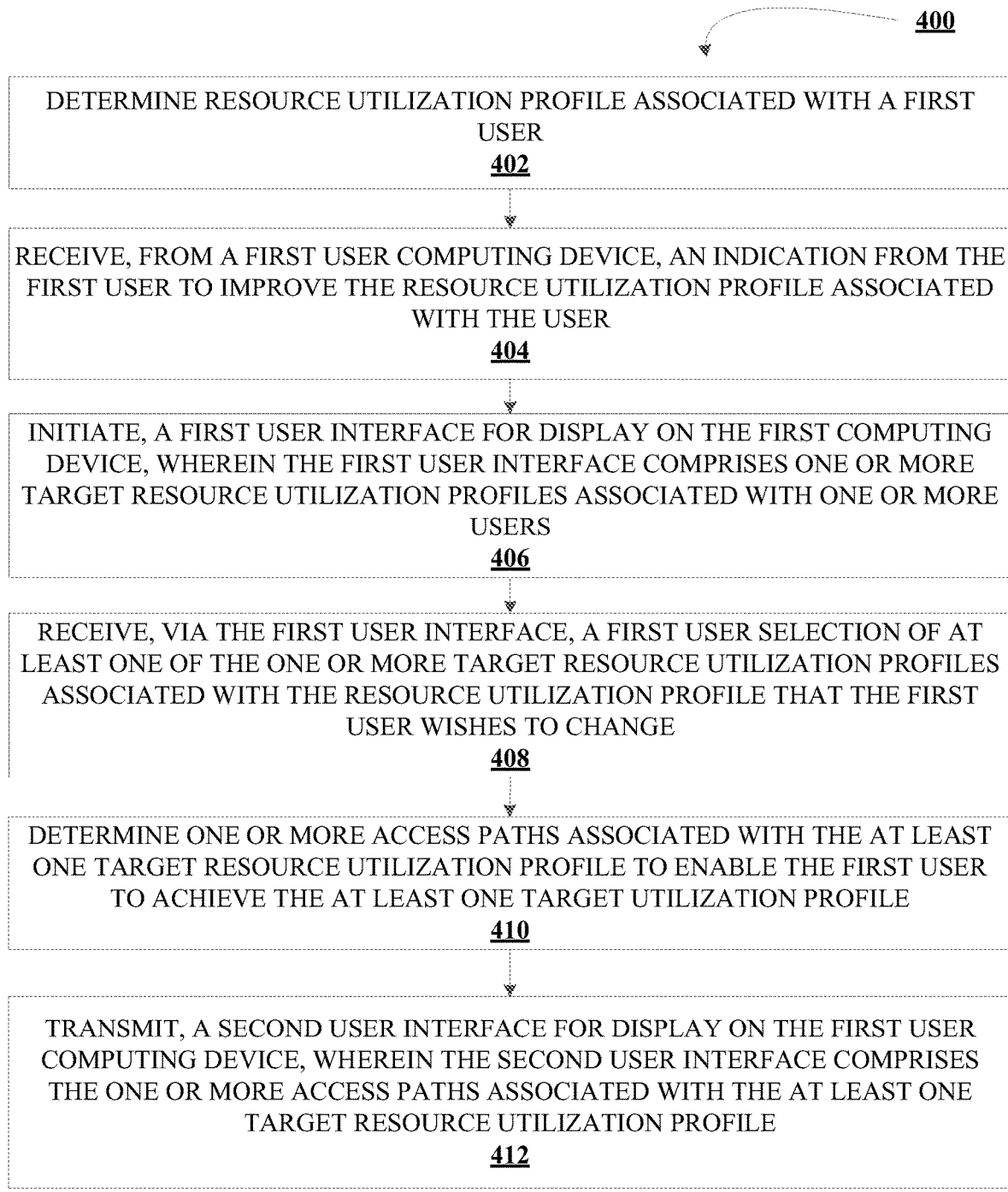
Figure 5:
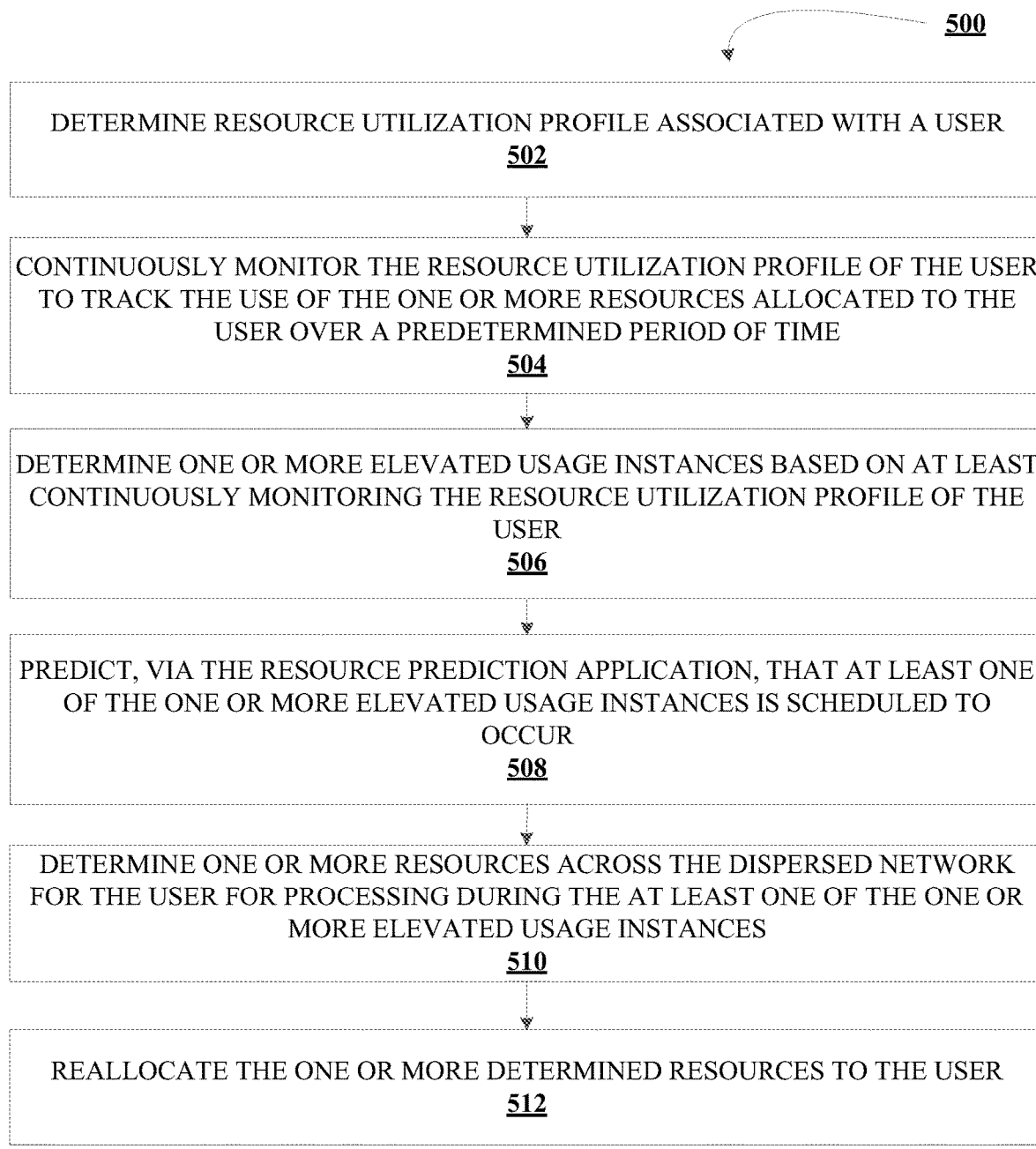

Having thus described embodiments of the invention in general terms, reference will now be made to the accompanying drawings, where:

FIG. 1 presents an exemplary block diagram of the system environment for implementing the process flows described herein in accordance with embodiments of the present invention;

FIG. 2 illustrates a flow diagram for creation of alternative path to resource acquisition, in accordance with an embodiment of the invention;

FIG. 3 illustrates a flow diagram for predictive acquisition and use of resources, in accordance with an embodiment of the invention;

FIG. 4 illustrates a flow diagram for a system for predictive use of resources across a dispersed Internet protocol capable network connecting devices electrically attached to the network, in accordance with an embodiment of an invention; and FIG. 5 illustrates a flow-diagram for predictive usage of resources across a dispersed Internet protocol capable network connecting devices electrically attached to the network, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. For clarity, non-essential elements may have been omitted from some of the drawing.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

As used herein, the term "resource" will generally refer to objects, products, devices, goods, commodities, services, and the like, and/or the ability and opportunity to access and use the same. Some example implementations herein contemplate property held by a user, including property that is stored and/or maintained by a third party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. Examples of resources that may not necessarily be associated with accounts may be particularized goods, such as distinct pieces of furniture, equipment, or other valuables, or the like. Similarly, "funds" or "available balance" refer to types of resources. For example, the term "fund" may be used to refer to one or more sets of monetary resources available to a user, and may also be referred to as an available balance, a collected balance, good funds, and usable funds.

In the context of example implementations described herein, a "transaction" or "resource distribution" refers to any transfer of resources and/or an obligation to return resources to and/or from a user. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

In accordance with embodiments of the invention, the terms "financial institution" and "financial entity" include any organization that processes financial transactions including, but not limited to, banks, credit unions, savings and loan associations, investment companies, stock brokerages, management firms, insurance companies and the like.

Many of the embodiments and example implementations thereof described herein are directed toward solving the myriad technical problems associated with effectively monitoring and managing resource usage and deployment when resources may be accessed and deployed in multiple way across multiple platforms in a dispersed network. Such technical difficulties can be compounded when resources may be deployed, accessed, and accumulated automatically and/or outside of the direct control of a user in every instance wherein a resource or portion thereof is deployed, accessed, and/or accumulated. With the aim of allowing a user an effective and efficient tool to monitor and access resources and conduct communications regarding the same, many example embodiments of the invention disclosed herein contemplate resource access communication device and/or module that is capable of serving as an interface between a user on the one hand and a user's computing device, one or more third-party systems associated with the user and/or resources associated with the user, and, in some instances, one or more secondary communication devices on the other hand.

Many of the example embodiments and implementations described herein contemplate interactions engaged in by a resource user with a computing device (e.g., a mobile device) and/or one or more resource access communication devices and/or secondary communication devices. A "user", as referenced herein, may refer to an entity or individual that has the ability and/or authorization to access and use one or more resources or portions of a resource. Furthermore, as used herein, the term "user computing device" or "mobile device" may refer to mobile phones, personal computing devices, tablet computers, wearable devices, and/or any portable electronic device capable of receiving and/or storing data therein.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

In some example implementations, a resource access communication device is capable of interacting with a user in the sense that it can detect and parse audible statements from a user (including but not limited to spoken commands, spoken questions, and other user speech) and/or written content from a user (including but not limited to text input by a user and/or other written commands or statements), and responding to the user in the form of performing transactions, transmitting credentials, establishing communication channels, prompting the user to perform one or more actions, scheduling meetings with personnel associated with one or more resources, and the like.

Many example implementations are particularly directed to a user's interaction with resources associated with the user and stored or otherwise associated with a third party financial institution. In some such implementations, a resource access communication device, as either a stand-alone device or one integrated into a user computing device, is capable of interacting with a banking application to facilitate the efficient and effective access, monitoring, deployment, and accumulation of resources by the user. For example, a resource access communication device that is capable of detecting and processing voice commands may be used by a user to translate statements made by the user, into operative transactions, such as the satisfaction of obligations, transfers of resources, subscription to certain products and/or services, responding to offers, and the like. Similarly, a resource access communication device that is capable of detecting and processing written statements from a user, such as text messages or other written messages may likewise be used to effectuate transactions and operations associated with resources and otherwise respond to user input Some example implementations contemplate resource access communication devices that are able to detect, parse, and respond to predetermined command words or phrases, colloquial and/or non-specific language, and/or other natural language in a manner that allows a user to effectively monitor and manage their resource usage. For example, such a resource access communication device may be capable of recognizing a statements such as "check my transaction history", "pay all outstanding obligations", or other similar declarative commands, and, in response to such commands, perform the requested operation, such as providing a copy of the user's transaction history (or a portion thereof, as requested), or such as initiating transactions to pay any bills or other obligations that have not yet been paid. In another example, a resource access communication device may be able to respond to questions such as "has my paycheck been deposited", "am I on track to retire", "tell me about this transaction I don't recognize" by requesting and receiving the appropriate data set and/or message information, and conveying it to the user. In another example, a resource access communication device may be configured to perform operations based on other input received from the user and/or information received from one or more third parties or other sources. In one such example, a user may articulate that certain items should be added to a grocery or other shopping list, that one or more goods or services are necessary for a home or vehicle, or the like. In response to the user input, the resource access communication device may locate and/or compile offers associated with the goods, services, and/or other products associated with the statements made by the user, and convey those offers and/or other information to the user.

While some example implementations contemplate a resource access communication device and/or module that is integrated into a user's mobile device, some example implementations contemplate one or more stand-alone resource access communication devices and/or one or more secondary communications devices. Some users may derive particularized benefits by having secondary communication devices deployed in advantageous positions around a home, workspace, or other locations, wherein such secondary communication devices are capable of communicating user input to a resource access communication device and relaying information back to the user. For example, a user may opt to position one secondary communication device in a kitchen, and recite items that may be needed for the completion of a particular recipe or a grocery list. The secondary communication device can in turn relay the information to a resource access communication device for further processing, and relay back to the user any response from the resource access communication device. Similarly, a user may opt to position a secondary communication device near where the user often processes mail or other correspondence, such that the user can provide instructions to pay bills or otherwise interact with service providers, entities associated with offers received by the user, and other entities associated with correspondence received by the user. Those skilled in the art will appreciate that a user may opt to position such secondary communication devices in any location where it may be advantageous to be able to issue speaking and/or written commands or statements to provide information about potential resource uses, initiate transactions, and/or otherwise monitor the status and use of resources.

FIG. 1 presents an exemplary block diagram of the system environment 100 for implementing the process flows described herein in accordance with embodiments of the present invention. As illustrated, the system environment 100 includes a network 101, a system 102, a user input system 122, a network system 142, and other network devices 152. Also shown in FIG. 1 is a user of the user input system 122. The user input system 122 may be a mobile device or other non-mobile computing device. The user may be a person who uses the user input system 122 to execute a user application 132. The user application 132 may be an application to communicate with the system 102 and/or the network system 142, perform a transaction, input information onto a user interface presented on the user input system 122, or the like. The user application 132, the network system 142, and/or the system application 112 may incorporate one or more parts of any process flow described herein.

As shown in FIG. 1, the system 102, the user input system 122, and the network system 142, are each operatively and selectively connected to the network 101, which may include one or more separate networks. In some embodiments, the network 101 additionally includes other network devices 152 that are operatively and selectively connected to the network 101. In addition, the network 101 may include a telecommunication network, local area network (LAN), a wide area network (WAN), and/or a global area network (GAN), such as the Internet. It will also be understood that the network 101 may be secure and/or unsecure and may also include wireless and/or wired and/or optical interconnection technology.

The user input system 122 may include any computerized apparatus that can be configured to perform any one or more of the functions of the user input system 122 described and/or contemplated herein. For example, the user may use the user input system 122 to transmit and/or receive information or commands to and from the system 102. In this regard, the system 102 may be configured to establish a communication link with the user input system 122, whereby the communication link establishes a data channel (wired or wireless) to facilitate the transfer of data between the user input system 122 and the system 102. In doing so, the system 102 may be configured to access one or more devices of the user input system 122, such as, a GPS device, an image capturing component (e.g., camera), a microphone, a speaker, or the like based on one or more predetermined triggers, whereby the system 102 activates the one or more devices of the user input system 122. In doing so, an otherwise offline device of the user input system 122 is connected to the network 101 and capable of transmitting and receiving information from the system 102. In some embodiments, for example, the user input system 102 may include a personal computer system (e.g. a non-mobile or non-portable computing system, or the like), a mobile computing device, a personal digital assistant, a mobile phone, a tablet computing device, a network device, and/or the like. As illustrated in FIG. 1, in accordance with some embodiments of the present invention, the user input system 122 includes a communication device 124, a processing device 126, a memory device 128 having a structured database/datastore 134 and computer readable instructions 130 that may be configured to cause the user application 132 stored therein to execute processes described with respect to the process flows described herein. Specifically, the user application 132 executes the process flows described herein.

As used herein, the data store 134 may be one or more distinct and/or remote databases. In some embodiments, the data store 134 is not located within the system and is instead located remotely from the system. In some embodiments, the structured database 138 stores information or data described herein.

It will be understood that the data store 134 may include any one or more storage devices, including, but not limited to, datastores, databases, and/or any of the other storage devices typically associated with a computer system. It will also be understood that the data store 134 may store information in any known way, such as, for example, by using one or more computer codes and/or languages, alphanumeric character strings, data sets, figures, tables, charts, links, documents, and/or the like. Further, in some embodiments, the data store 134 may include information associated with one or more applications, such as, for example, the user application 132. It will also be understood that, in some embodiments, the data store 134 provides a substantially real-time representation of the information stored therein, so that, for example, when the processing device 126 accesses the data store 134, the information stored therein is current or substantially current.

Each processor described herein, including the processing device 126, generally includes circuitry for implementing the audio, visual, and/or logic functions of the user input system 122. For example, the processing device may include a digital signal processor device, a microprocessor device, and various analog-to-digital converters, digital-to-analog converters, and other support circuits. Control and signal processing functions of the system in which the processor resides may be allocated between these devices according to their respective capabilities. The processing device may also include functionality to operate one or more software programs based at least partially on computer-executable program code portions thereof, which may be stored, for example, in a memory device, such as in the user application 122 of the memory device 128 of the user input system 122.

Each memory device described herein, including the memory device 128 for storing the user application 122 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

As shown in FIG. 1, the memory device 128 includes the user application 132. In some embodiments, the user application 132 includes an interface for communicating with, navigating, controlling, configuring, and/or using the user input system 122. In some embodiments, the user application 132 includes computer readable instructions/program code portions 130 for instructing the processing device 126 to perform one or more of the functions of the user application 132 described and/or contemplated herein. In some embodiments, the user application 132 may include and/or use one or more network and/or system communication protocols.

FIG. 1 also illustrates a system 102, in accordance with an embodiment of the present invention. The system 102 may refer to the "apparatus" described herein. The system 102 may include any computerized apparatus that can be configured to perform any one or more of the functions of the system 102 described and/or contemplated herein. In accordance with some embodiments, for example, the system 102 may include a computer network, an engine, a platform, a server, a database system, a front end system, a back end system, a personal computer system, and/or the like. Therefore, the system 102 may be a server managed by the business. The system 102 may be located at the facility associated with the business or remotely from the facility associated with the business. In some embodiments, such as the one illustrated in FIG. 1, the system 102 includes a communication device 104, a processing device 106, a memory device 108 having a structured database/datastore 114 and computer readable instructions 110 that may be configured to cause the system application 112 stored therein to execute processes described with respect to the process flows described herein. Specifically, the system application 112 executes the process flows described herein. In some embodiments, the system 100 includes a resource monitoring engine that is configured to access historical resource utilization database to monitor users' historical resource utilization. For example, in those embodiments of the invention in which the resource being re-allocated is funds in a checking account/DDA, the historical resource utilization database may be a financial transaction database, which stores records of user's financial transactions (i.e., debits/withdrawals, purchases, credits, transfers and the like). In addition, resource monitoring engine is configured to access scheduled resource utilization database to assess/monitor user's future planned/scheduled resource utilization. For example, in those embodiments in which the resource being re-allocated is funds in a checking/DDA account, the scheduled resource utilization database may be a scheduled transaction database, which stores records of users' planned future financial transactions (e.g., known recurring payments/transactions, scheduled bill pay transactions and the like), including proximate or definitive date(s) and amount(s). In some other embodiments, the system 100 additionally includes a resource re-allocation engine that is configured to determine a re-allocation volume or amount based on at least one of the users' historical resource utilization and/or future planned/scheduled resource utilization and, in response to determining the volume/amount, automatically re-allocate the resources. It should be noted that the determination of the re-allocation amount is a logical determination that may be based on other information and/or factors available to the resource re-allocation engine.

It will be understood that the system application 112 may be configured to implement any one or more portions of the various user interfaces and/or process flow described herein. The system application 112 may interact with the user application 132. It will also be understood that, in some embodiments, the memory includes other applications. It will also be understood that, in some embodiments, the system application 112 is configured to communicate with the data store 114, the user input system 122, or the like.

It will be further understood that, in some embodiments, the system application 112 includes computer readable instructions/program code portions 110 for instructing the processing device 106 to perform any one or more of the functions of the system application 112 described and/or contemplated herein. In some embodiments, the system application 112 may include and/or use one or more network and/or system communication protocols.

In addition to the system application 112, the memory device 108 also includes the structured database/datastore 114. As used herein, the data store 114 may be one or more distinct and/or remote databases. In some embodiments, the data store 114 is not located within the system and is instead located remotely from the system. In some embodiments, the data store 114 stores information or data described herein.

It will be understood that the data store 114 may include any one or more storage devices, including, but not limited to, datastores, databases, and/or any of the other storage devices typically associated with a computer system. It will also be understood that the data store 114 may store information in any known way, such as, for example, by using one or more computer codes and/or languages, alphanumeric character strings, data sets, figures, tables, charts, links, documents, and/or the like. Further, in some embodiments, the data store 114 may include information associated with one or more applications, such as, for example, the system application 112. It will also be understood that, in some embodiments, the data store 114 provides a substantially real-time representation of the information stored therein, so that, for example, when the processing device 106 accesses the data store 114, the information stored therein is current or substantially current.

FIG. 1 also illustrates a network system 142, in accordance with an embodiment of the present invention. The network system 142 includes a communication device 144 operatively coupled with an image capturing device 146 and a processing device 147, which are also communicably coupled with a memory device 148. The processing device 147 is configured to control the communication device 144 such that the network system 142 communicates across the network 101 with one or more other systems, such as the user input system 122 and/or the system 102. The processing device 147 is also configured to access the memory device 148 in order to read the computer readable instructions 150, which in some embodiments includes a device application 152. The memory device 148 also includes a datastore 154 or database for storing pieces of data that can be accessed by the processing device 147.

It will be understood that the device application 152 may be configured to implement any one or more portions of the various user interfaces and/or process flow described herein. The device application 152 may interact with the user application 132 and/or the system application 112, and vice versa. It will also be understood that, in some embodiments, the memory includes other applications. It will also be understood that, in some embodiments, the device application 152 is configured to communicate with the structured database 154, the user input system 122, or the like.

It will be further understood that, in some embodiments, the system application 112 includes computer readable instructions/program code portions 110 for instructing the processing device 106 to perform any one or more of the functions of the system application 112 described and/or contemplated herein. In some embodiments, the system application 112 may include and/or use one or more network and/or system communication protocols.

In addition to the system application 112, the memory device 108 also includes the structured database/datastore 114. As used herein, the data store 114 may be one or more distinct and/or remote databases. In some embodiments, the data store 114 is not located within the system and is instead located remotely from the system. In some embodiments, the data store 114 stores information or data described herein.

It will be understood that the data store 114 may include any one or more storage devices, including, but not limited to, datastores, databases, and/or any of the other storage devices typically associated with a computer system. It will also be understood that the data store 114 may store information in any known way, such as, for example, by using one or more computer codes and/or languages, alphanumeric character strings, data sets, figures, tables, charts, links, documents, and/or the like. Further, in some embodiments, the data store 114 may include information associated with one or more applications, such as, for example, the system application 112. It will also be understood that, in some embodiments, the data store 114 provides a substantially real-time representation of the information stored therein, so that, for example, when the processing device 106 accesses the data store 114, the information stored therein is current or substantially current.

It will be understood that the embodiment of the system environment illustrated in FIG. 1 is exemplary and that other embodiments may vary. As another example, in some embodiments, the system 102 includes more, less, or different components. As another example, in some embodiments, some or all of the portions of the system environment 100 may be combined into a single portion. Likewise, in some embodiments, some or all of the portions of the system 102 may be separated into two or more distinct portions.

In addition, the various portions of the system environment 100 may be maintained for and/or by the same or separate parties. It will also be understood that the system 102 may include and/or implement any embodiment of the present invention described and/or contemplated herein. For example, in some embodiments, the system 102 is configured to implement any one or more of the embodiments of the process flows described and/or contemplated herein in connection any process flow described herein. Additionally, the system 102, the network system 142, and/or the user input system 122 may be configured to initiate presentation of any of the user interfaces described herein.

Millennials starting out after college typically do not have any credit built up for availing financial loans to purchase large items such as vehicles or homes. Many times, parents or other individuals may have to co-sign on a lease or mortgage for such millennials. The present system provides the functional benefit of providing an alternative credit building mechanism for a user who is a millennial. The system demystifies credit by allowing the user to receive badges for completing various training courses provided by the system. Further, the system may review that the user went to school, has a job offer, and/or the like that may be a predictive factor of creditworthiness. Finally, the system may allow the user to begin-back off of their parents' credit. The system may generate a creditworthiness confidence score for the user allowing the user to be eligible to purchase financial products such as a mortgage loan without co-signers. In this way, the present system may be configured to provide an alternative path for the user to acquire certain resources (e.g., mortgage loan).

FIG. 2 illustrates a flow diagram for creation of alternative path to resource acquisition 200, in accordance with an embodiment of the invention. The present invention provides the functional benefit of establishing access protocols for access to a resource across a dispersed Internet protocol capable network connecting devices electrically attached to the network. As shown in block 202, the system may be configured to receive, from a user computing device, an indication from a user to access a resource. In this regard, the system may be configured to initiate a control path connection on a network layer between one or more computing devices attached to a dispersed network and at least one distributed server. In one aspect, the user computing device is associated with the one or more computing devices.

As described herein, a resource may generally refer to objects, devices, products, goods, commodities, services, and the like, and/or the ability and opportunity to access and use the same. Some example implementations herein contemplate property held by a user, including property that is stored and/or maintained by a third party entity, financial products provided by an entity and/or a third party, or the like. Next, as shown in block 204, the system may be configured to transmit control signals configured to cause a display device of the user computing device to display a first user interface on the user computing device. In some embodiments, the first user interface includes an option for the user to establish an authorization profile. In one aspect, an authorization profile refers to profiles created for specific users by associating rules (e.g., network authorization policies) such that whenever these rules match the configured attributes, the corresponding authorization profile enables the user to gain access to a resource. For example, with respect to resource management within a dispersed network, the authorization profile includes one or more authorization rules. These authorization rules typically include one or more elements such as name, attribute, and permission. When these rules match the pre-configured attributes of the dispersed network, the user with the corresponding authorization profile is granted access (e.g., read, write, and/or execute privileges) to the dispersed network (e.g., financial institution network services). In another aspect, an authorization profile refers to a profile developed based on information associated with a user's history of payment punctuality, the total amount of available credit, the total amount and type of future expenses the user has, the number of open and active financial accounts, and/or the longevity of the user's relationships with entities (e.g., financial institutions, creditors, and/or the like). In this regard, entities may use the authorization profile indicating a creditworthiness of the user to help determine whether the user may qualify for credit and what interest rate they might pay. In some cases, the authorization profile of the user may indicate an exposure level associated with the user as a potential customer of the entity.

Next, as shown in block 206, the system may be configured to receive, via the first user interface, a user acknowledgment to establish the authorization profile. Prior to establishing an authorization profile, the system may be configured to determine whether the user has authorization to access the resource. In this regard, when the user requests authorization to access the resource, the system may be configured to determine whether the user has the authorization to access the resource. In determining that the user does not have the authorization to access the resource, the system may be configured to initiate a data path connection with the user computing device associated with the user to indicate that the user does not have the authorization to access the resource. In this regard, the system may be configured to transmit control signals configured to cause the display device of the user computing device to display the first user interface on the user computing device indicating that the user is not authorized to access the resource.

In response to receiving the indication that the user wishes to establish an authorization profile, the system may be configured to determine one or more access paths associated with an authorization model to enable the user to establish the authorization profile, as shown in block 208. In some embodiments, the user may already be associated with an authorization level. In one aspect, determining that the user is not authorized to access the resource includes determining that the authentication level of the user is lower than a predetermined threshold authorization level required to access the resource. Next, as shown in block 210, the system may be configured to transmit control signals configured to cause a display device of the user computing device to display a second user interface on the user computing device. In this regard, the second user interface includes the one or more access paths associated with the authorization model to enable the user to establish the authorization profile.

In some embodiments, the one or more access paths include one or more training courses provided by the system for the user to complete to aid in the establishing on the authorization profile. In this regard, each training course may include one or more actions that need to be executed by the user. In one aspect, each time the user completes the execution of an action, the system may be configured to provide the user with certificates of completion that corresponds to an increase in the authentication level associated with the user's authorization profile. In some embodiments, the system may be configured to receive, via the second user interface, a user selection of at least one of the one or more access paths to establish the authorization profile. In response, the system may be configured to determine one or more actions associated with the at least one of the one or more access paths to be executed by the user to establish the authorization profile.

In one aspect, the user profile indicates a lifestyle of the user. In some embodiments, the one or more traits user profile may be determined based on at least one or more past transactions of the user (financial or otherwise), a geographic location of the user, an amount of incoming funds, an amount of outgoing funds, resource values, future expenses for past services consumed, resource types, spending history, saving history or the like. In one aspect, the user profile includes at least information identifying the user. In some embodiments, the system may be configured to establish predefined user profiles including, but not limited to travel profiles, homebody, luxury spender, thrifty saver, or the like. The profiles may be pre-programed by the entity and/or programmable by the user. In some embodiments, the system may be configured to enable the user to customize the determined user profile. In this regard, the system may be configured to enable the user to select a predetermined user profile and customize the user profile according to the characteristics of the user by providing additional information. In some embodiments, the one or more characteristic traits include but are not limited to determining an employment status, education level, one or more financial events of the user, and/or the like. In one aspect, a financial event may be a credit transaction, a payment, and exchange, or the like that may cause the user to lose or gain money and/or resources.

In one aspect, the user profile indicates a lifestyle of the user. In some embodiments, the one or more traits user profile may be determined based on at least one or more past transactions of the user (financial or otherwise), a geographic location of the user, an amount of incoming funds, an amount of outgoing funds, resource values, resource types, spending history, saving history or the like. In one aspect, the user profile includes at least information identifying the user. In some embodiments, the system may be configured to establish predefined user profiles including, but not limited to travel profiles, homebody, luxury spender, thrifty saver, or the like. The profiles may be pre-programed by the entity and/or programmable by the user. In some embodiments, the system may be configured to enable the user to customize the determined user profile. In this regard, the system may be configured to enable the user to select a predetermined user profile and customize the user profile according to the characteristics of the user by providing additional information. In some embodiments, the one or more characteristic traits include but are not limited to determining an employment status, education level, one or more financial events of the user, and/or the like. In one aspect, a financial event may be a credit transaction, a payment transaction, and exchange, or the like that may cause the user to lose or gain money and/or resources.

In some embodiments, in response to determining a score associated with one or more actions executed by the user, and data mining one or more characteristic traits of the user based on the user profile, the system may be configured to determine an authorization level associated with the authorization profile. In this way, the system may be configured to continuously monitor the user computing device to determine the authentication level. When the authentication level associated with the authentication profile is greater than a predetermined threshold required to access the resource, the system may be configured to transmit control signals configured to cause the display device of the user computing device to display an acknowledgement on the user computing device indicating an approval of the user request to access the resource.

By way of example, the authorization profile may be an interpretation of the information in the user's credit file. In this regard, the credit information in conjunction with other criteria such as an annual amount of incoming funds, employment information, and amount of outstanding future expenses may be used to determine an authorization profile. If the user has not had the opportunity to develop an authorization profile or does not have adequate information to generate a credit information, the user may not be able to acquire approvals for certain financial institution products. Examples of financial products include, but are not limited to loans, investment accounts, checking accounts, savings accounts, trust management, accounting services, and/or the like. In such situations, the present invention may provide the functional benefit of enabling the user to develop an authorization profile similar to a credit information or an equivalent. As discussed herein, the system may be configured to enable the user to establish an authentication profile by having the user complete a set of training courses, each comprising a series of tasks. By continuously monitoring the user computing device, the system may be configured to determine whether the user has completed the execution of the tasks. In some embodiments, the user may be presented with dynamically generated for the completion of each task and/or training course. In this regard, the certificates may be an electronic document that includes but is not limited to, information associated with the certificate, information associated with the user's identity, and/or a digital signature of the entity that has verified that the user has executed the one or more tasks and/or training course. The user may present the certificate to the system as an indication that the user has completed the execution of the one or more tasks and/or the training courses.

In some embodiments, in response to determining that the authorization level is greater than a predetermined threshold authorization level required to access the resource, the system may be configured to transmit control signals configured to cause the one or more computing devices connected to the dispersed network to initiate execution of one or more queries to enable the user to access the resource. In this regard, the system may be configured to modify an IP address associated with the user computing device and an IP address associated with the resource (e.g., network device), to enable a data flow between one or more ports associated with the user computing device and the resource. In some embodiments, if the user computing system and the resource are associated with disparate networks, the system may reconfigure an IP address associated with an IP gateway, a node that allows communication between networks, to establish dataflow between the disparate networks and/or the user computing device and the resource.

In some embodiments, the system may be configured for predictive acquisition of resources across a dispersed Internet protocol capable network connecting devices electrically attached to the network. In this regard, the system may be configured to monitor the usage of at least one or more one or more resources accessible by the user, via the user computing device, and enable the user to optimize the use of the resources by determining the resource usage trends associated with the use of resources by the user. In one example, the user may indicate that he/she has made a change in his/her purchase history. For example, the user could stop drinking Brand-name coffee. The day the user makes the decision to stop drinking Brand-name coffee, the user may select that as the start date. While the system may not know specific SKU level or product level data about the change, the system may monitor the user's transaction history to identify any trends moving forward from the initiation date. The system may dynamically generate a graphical representation (GUI) of the changes from the initiation date. Furthermore, the system may automatically direct the savings from the change into an alternative financial institution account for the user.

FIG. 3 illustrates a flow diagram for predictive acquisition and use of resources 300, in accordance with an embodiment of the invention. As shown in block 302, the system may be configured to receive, from a first user computing device, an indication from a user to initiate a change associated with a resource utilization profile of the user. In one aspect, the change initiated by the user may be specific to a particular resource, or a specific set of resources. In another aspect, the change initiated by the user may include restricting the user of a particular resource or a specific set of resources. In yet another aspect, the change initiated by the user may include one or more conditions associated with the use of the one or more resources associated with the user. In this regard, the one or more conditions may be predetermined by the system. In some embodiments, the one or more conditions may be determined by the user.

In response to receiving the indication from the user to initiate a change, the system may be configured to initiate a first user interface for display on the first user computing device, as shown in block 304. In this regard, the first user computing device may be associated with the one or more computing devices attached to the dispersed network. In one aspect, the first user interface includes one or more resources associated with the resource utilization profile of the user. In one example, a change initiated by the user may refer to a change in the purchasing history of the user. In this regard, the user may make the decision to alter his/her purchasing history to buy Brand-name coffee on a regular basis.

In response, the system may be configured to receive, via the first user interface, a user selection of at least one of the one or more resources associated with the resource utilization profile that the user wishes to change, as shown in block 306. In one example, the system may be configured to determine one or more recurring transactions indicating a purchasing history of the user. In response, the system may be configured to initiate the presentation at least one of the one or more determined purchasing history as a recommendation to the user as a contender the change. In some embodiments, the user selection of a resource may establish an initial state and/or initial time associated with the indicated change.

In some embodiments, the change initiated by the user may require reallocation of resources associated with the resource utilization profile of the user. In this regard, the system may be configured to automatically reallocate within the dispersed network, at least one of the one or more resource associated with the user to cater to the change initiation by the user. In one aspect, the system may be configured to receive user authorization for the reallocation of the at least one of the one or more resources prior to reallocating the resources.

Next, as shown in block 308, the system may be configured to continuously monitor the one or more resources associated with the resource utilization profile across the dispersed network for a predetermined amount of time since the initiation of the change by the user. In this regard, the system may be configured to monitor the use of each of the one or more resources associated with the resource utilization profile of the user. In some embodiments, the system may be configured to monitor whether the use of each of the one or more resources associated with the utilization profile of the user is within the rails of the one or more conditions. In embodiments where the use of the one or more resources are not within the rails of the one or more conditions, the system may be configured to generate an alert indicating that at least one of the one or more conditions have been violated. For example, the system may be configured to monitor transaction information associated with each transaction executed by the user since the initiation of the change.

Next, as shown in block 310, the system may be configured to determine a utilization trend associated with the resource utilization profile of the user. In some embodiments, the system may be configured to determine a pattern associated with the utilization of the one or more resources by the user based on at least continuously monitoring the one or more resources. In one example, the utilization trend may be based on the user profile. In this way, the utilization trend may provide an accurate indication of the user reflecting the already established user profile, which includes but is not limited to travel profiles, homebody, luxury spender, thrifty saver, or the like.

Next, as shown in block 312, the system may be configured to dynamically generate a graphical representation of the utilization trend. In this regard, the graphical representation is configurable in real-time and provides a visual representation of the utilization trend of the user. In response to generating the graphical representation, the system may then be configured to transmit control signals configured to cause the first user computing device to display the graphical representation of the utilization trend to the user, as shown in block 314. In this regard, the system may configure a display device associated with the first user computing device to display the graphical representation of the utilization trend, thereby providing information to the user in real time. In embodiments where at least one of the one or more conditions have been violated, the system may be configured to transmit control signals configured to cause the display device associated with the first user computing device to display an alert. In one aspect, the alert may be an audible tone, a visual indicator (e.g., blinking LED), a text message, a pop-up message, and/or the like.

In some embodiments, the system may be configured to determine a past utilization trend associated with the utilization profile of the user based on at least continuously monitoring the one or more resources across the dispersed network for a predetermined amount of time prior to the initiation of the change by the user. The system may then be configured to compare the past utilization trend with the utilization trend associated with the utilization profile of the user for the predetermined amount of time since the initiation of the change by the user. In one example, the past utilization trend may indicate that the user has purchased food from restaurants at least three times during the week. If the change initiated by the user involves reducing the number of instances of purchasing food from restaurants during the week, the system may be configured to track, in real-time, the utilization trend of the user for a predetermined amount of time since the initiation of the change. In response, the system may be configured to determine a utilization savings associated with the one or more resources. Continuing from the previous example, the system may determine monetary savings accumulated by the user due to the change.

In some embodiments, the utilization savings is continuously updated based on at least continuously monitoring the one or more resources associated with the utilization profile associated with the user across the dispersed network. In embodiments where the utilization savings include monetary savings, the system may be configured to deposit the utilization savings into a financial institution account of the user.

In one aspect, the system may be configured to determine a change in the utilization of the one or more resources associated with the utilization profile based on at least the change in the utilization of at least one of the one or more resources initiated by the user. For example, the system may be configured to continuously monitor the transaction information associated with the user by extracting SKU level or product level information from the transaction receipt to accurately determine utilization savings. In this regard, the system may be configured to determine that by changing the purchasing history of eating out three times a week, the user has incurred savings in travel expenses to go to and from the restaurants.

In some embodiments, the graphical representation of the utilization trend may also include the utilization savings, which may be continuously updated concurrently with the utilization trend. In this regard, the system may be configured to reconfigure the graphical representation by generating an integrated interface capable of displaying both the utilization trend and the utilization savings, although the data sources for the utilization trend and utilization savings is different. In one aspect, the alert generated to indicate that the user of the one or more resource are not within the rails of the one or more conditions may also be integrated into the graphical representation generated to display the utilization trend and utilization savings.

In some other embodiments, the system may be configured to determine that the user has utilized the one or more resources associated with the change initiated by the user based on at least continuously monitoring the resource utilization profile of the user for the predetermined period of time. In doing so, the system may determine that the user has deviated from the initiated change. In response, the system may be configured to implement one or more assessments to reprove the user for deviating from the initiated change in an attempt to persuade the user to maintain the initiated change.

In some other embodiments, the system may be configured to determine that the user has utilized the one or more resources associated with the change initiated by the user based on at least continuously monitoring the resource utilization profile of the user for the predetermined period of time. In doing so, the system may determine that the user has deviated from the initiated change. In response, the system may be configured to implement one or more actions to correct the user for deviating from the initiated change in an attempt to persuade the user to maintain the initiated change.

In some embodiments, the system of the present invention may be configured for predictive use of resources across a dispersed Internet protocol capable network connecting devices electrically attached to the network. In this regard, the present invention provides the functional benefit of allowing a user to visualize a current financial position relative to other individuals similarly situated to the user. Further, the present invention allows the user to view categories of individuals who have been associated with the financial institution longer than the user to see their financial positions and possible paths for the user to attain similar financial positions. In this regard, the present invention allows a user to select a path or savings to reach a category and/or financial position and the decisions the users already in those financial positions made to get to that level. Also, the present invention presents one or more advantages and/or rewards associated with the financial positions of the other users to direct the user to also achieve same or similar financial positions.

Next, as shown in block 404, the system may be configured to receive from a first user computing device, an indication from the first user to improve the resource utilization profile associated with the user. In response, the system may be configured to initiate, a first user interface for display on the first computing device, wherein the first user interface comprises one or more target utilization profiles associated with one or more users, as shown in block 406. In some embodiments, the target utilization profiles may be determined based on a user profile associated with the first user and the one or more other users. In this regard, the system may be configured to determine a first user profile associated with the first user. As described herein, the user profile indicates a lifestyle of the user. In some embodiments, the one or more traits user profile may be determined based on at least one or more past transactions of the user (financial or otherwise), a geographic location of the user, an amount of incoming funds level, an amount of outgoing funds, resource values, future expenses for past services consumed, resource types, spending history, saving history or the like. In one aspect, the user profile includes at least information identifying the user. In some embodiments, the system may be configured to establish predefined user profiles including, but not limited to travel profiles, homebody, luxury spender, thrifty saver, or the like. The profiles may be pre-programed by the entity and/or programmable by the user.

FIG. 4 illustrates a flow diagram for a system for predictive use of resources across a dispersed Internet protocol capable network connecting devices electrically attached to the network 400, in accordance with an embodiment of an invention. As shown in block 402, the system may be configured to determine a resource utilization profile associated with a first user. In some embodiments, the resource utilization profile include usage statistics associated with one or more resources associated with the resource utilization profile allocated to the user across the dispersed network. In some embodiments, determining resource utilization may include determining utilization of the resources that are associated with financial resources, which are allocated by automatically transferring the resources (i.e., monetary funds or the like) from one type of financial account to another type of financial account. Specifically, the allocation and/or re-allocation of resources may comprise automatic transfer of funds from a low yield account, such as checking account/Demand Deposit Account (DDA) to a prospectively higher yield account, such as an investment account or the like or vice versa (i.e., from the prospectively high yield account to the lower yield account).

Next, as shown in block 404, the system may be configured to receive from a first user computing device, an indication from the first user to improve the resource utilization profile associated with the user. In response, the system may be configured to initiate, a first user interface for display on the first computing device, wherein the first user interface comprises one or more target utilization profiles associated with one or more users, as shown in block 406. In some embodiments, the target utilization profiles may be determined based on a user profile associated with the first user and the one or more other users. In this regard, the system may be configured to determine a first user profile associated with the first user. As described herein, the user profile indicates a lifestyle of the user. In some embodiments, the one or more traits user profile may be determined based on at least one or more past transactions of the user (financial or otherwise), a geographic location of the user, an amount of incoming funds level, an amount of outgoing funds, resource values, resource types, spending history, saving history or the like. In one aspect, the user profile includes at least information identifying the user. In some embodiments, the system may be configured to establish predefined user profiles including, but not limited to travel profiles, homebody, luxury spender, thrifty saver, or the like. The profiles may be pre-programed by the entity and/or programmable by the user.

In response to determining the first user profile associated with the first user, the system may be configured to compare the first user profile with one or more user profiles associated with the one or more other users to determine a match. In one aspect, the system may be configured to determine a percentage score associated with the match. In response to determining the percentage score, the system may be configured to determine the one or more target resource utilization profiles associated with one or more users. In one aspect, the one or more target profiles may be determined based on at least comparing the percentage score associated with the match with a predetermined threshold score. If the percentage score is greater than the predetermined threshold, the one or more user profiles associated with the one or more users is chosen to be presented to the user.

Next, as shown in block 408, the system may be configured to receive, via the first user interface, a first user selection of at least one of the one or more target resource utilization profiles associated with the utilization profile that the first user wishes to change. In this regard, the user may select which target resource utilization profile the user would like to emulate in an attempt to improve his/her resource utilization profile. In some embodiments, the user may want to improve his/her resource utilization profile according to the resource utilization profile of a specific user. In some other embodiments, the user may want to improve his/her utilization profile according to one or more resource utilization profiles of one or more users in a common tier. In such situations, the system may be configured to enable the user to provide the information associated with target resource utilization profiles associated with the utilization profile that the first user wishes to change.

Next, as shown in block 410, the system may be configured to determine one or more access paths associated with the at least one target resource utilization profile to enable the first user to achieve the at least one target utilization profile. In some embodiments, the one or more access paths indicate one or more ways in which the user may achieve the target utilization profile. In this regard, the each access path may include one or more actions that requires execution by the user. By executing each of the one or more actions, the user may advance via the associated access path to eventually achieve the target resource utilization profile. For example, the one or more actions may include allocation and/or reallocation of one or more resources associated with the resource utilization profile of the user, changing utilization trend associated with the resource utilization profile of the user, establishing one or more rails and/or conditions in the utilization of at least one of the one or more resources associated with the resource utilization profile of the user, and/or the like.

Next, as shown in block 412, the system may be configured to transmit, a second user interface for display on the first user computing device, wherein the second user interface comprises the one or more access paths associated with the at least one target resource utilization profile to enable the first user to achieve the at least one target utilization profile. In some embodiments, the system may be configured to receive, via the second user interface, a first user selection of at least one of the one or more access paths to achieve the at least one target utilization profile. In response, the system may be configured to determine one or more actions associated with the at least one of the one or more access paths to be executed by the first user to enable the first user to achieve the at least one target utilization profile. In some embodiments, the system may be configured to initiate a third user interface for display on the first user computing device, wherein the third user interface comprises the one or more actions associated with the at least one of the one or more access paths. In response, the system may be configured to receive, via the third user interface, a user input indicating an execution of at least one of the one or more actions by the first user associated with the at least one of the one or more access paths to achieve the at least one target utilization profile. In this regard, the system may be configured to continuously monitor the first user computing device to determine the execution of at least one of the one or more actions by the first user associated with the at least one of the one or more access paths to achieve the at least one target utilization profile.

In some embodiments, the system may be configured to dynamically generate a graphical representation (e.g., GUI) of the resource utilization profile of the first user reflecting a utilization of one or more resources of the first user in real-time. Once the graphical representation is generated, the system may be configured to transmit control signals configured to cause the first user computing device to display the graphical representation of the resource utilization profile. In some embodiments, the system may be configured to determine a progress level associated with the first user's progress towards achieving the at least one target utilization profile. This may be achieved by configuring the system to continuously monitor the user's utilization of the one or more resources allocated and/or re-allocated to him/her. In one aspect, the system may be configured to continuously update the progress level based on at least continuously monitoring the first user computing device to determine the execution of at least one of the one or more actions by the first user associated with the at least one of the one or more access paths.

In some embodiments, the system may be configured to dynamically optimize the reallocation of the one or more resources for the user based on at least one or more factors. In one aspect, the one or more factors may include, but are not limited to market forces, changes in the user profile associated with the user (e.g., new job, education level, geographic location, of the like), financial opportunities, or the like. In some other embodiments, the system may be configured to establish one or more check points to evaluate the resource allocation of the user. In doing so, the system may determine one or more alternative target utilization profiles relative to the user's financial position at a particular time (e.g., the one or more check-points).

In some embodiments, the present invention provides a functional benefit for predictive usage of resources across a dispersed Internet protocol capable network connecting devices electrically attached to the network. For example, the system may be configured to gather information about the user's typical purchase history, such as grocery list, gas purchases, and other regular expenses. In this regard, the system may be configured to monitor the user's utilization of resources and performs predictive allocation of the resources for upcoming events, such as the identification of a holiday, a vacation, or the like that may require additional resource allocation for food or travel for that time period.

FIG. 5 illustrates a flow-diagram for predictive usage of resources across a dispersed Internet protocol capable network connecting devices electrically attached to the network 500, in accordance with an embodiment of the invention. As shown in block 502, the system may be configured to determine resource utilization profile associated with the user. As discussed herein, the resource utilization profile includes information associated with one or more resources allocated to the user across the dispersed network. Further, as shown in block 504, the system may be configured to continuously monitor the resource utilization profile of the user to track the use of the one or more resources allocated to the user over a predetermined period of time. In some embodiments, a resource may be tracked by implementing a resource specific tracking algorithm on the computing device of the user in such a way that when the user accesses and/or utilizes the resource, the tracking algorithm stored thereon is activated. In doing so, the tracking algorithm may be configured to establish a communication link with the system and create a data channel capable of transmitting tracking data indicating the use of the resource to the system for additional processing.

Next, as shown in block 506, the system may be configured to determine one or more elevated usage instances based on at least continuously monitoring the resource utilization profile of the user. In some embodiments, the system may be configured to predict that at least one of the one or more elevated usage instances is scheduled to occur. As used herein, an "elevated usage instance" may refer to scenarios where the utilization capacity of resources may be lesser than the cost involved in the utilization of the resource. In one example, an elevated usage instance may occur if the transaction cost is greater than the upper limit associated with a credit card the user uses to execute similar transactions. In this regard, the system may be configured to determine a predetermined number of instances in the past when the elevated usage instances have occurred. In doing so, the system may be configured to analyze the instances and determine a pattern associated with the resource utilization profile of the user based on at least tracking the use of the one or more resources allocated to the user over a predetermine period of time. In response, the system may then be configured to predict that at least one of the one or more elevated usage instances is scheduled to occur based on at least determining the pattern associated with the utilization profile of the user. In some embodiments, the system may be configured to retrieve information associated with the utilization of the one or more resources during the occurrence of at least one of the one or more previous elevated usage instances. In one aspect, the information includes one or more traits associated with the user and/or the one or more resources. In response, the system may be configured to continuously compare the information associated with the utilization of the one or more resources during the occurrence of at least one of the one or more previous elevated usage instances with information associated with a current utilization of the one or more resources.

Next, as shown in block 508, the system may be configured to predict, via the resource prediction application, that at least one of the one or more elevated usage instances is scheduled to occur. In this regard, the system may be configured to calculate a score indicating a probability that the information associated with the utilization of the one or more resources during the occurrence of at least one of the one or more previous elevated usage instances approaches the information associated with the current utilization of the one or more resources. Based on the calculated score, the system may then be configured to predict that at least one of the one or more elevated usage instances is scheduled to occur. For example, the system may be configured to determine one or more specific transactions executed by the user in the days and/or weeks leading to a vacation planned during a predetermine time period (e.g., summer season) of the year. When the user begins using specific credit cards (resources) to execute similar transactions (e.g., purchasing flight tickets), the system may calculate a score indicating the probability that the user may go on vacation, thereby predicting an elevated usage instance.

Next, as shown in block 510, the system may be configured to determine one or more resources across the dispersed network for the user for processing during the at least one of the one or more elevated usage instances. In response to determining the one or more resources to process the elevated usage instances, the system may be configured to reallocate the one or more determined resources to the user, as shown in block 512. In some embodiments, the system may be configured to automatically reallocate the one or more determined resources to the user for processing during the at least one of the one or more elevated usage instances. In some other embodiments, the system may be configured to initiate a presentation of a first user interface for display on a user computing device, wherein the first interface comprises one or more determined resources to the user for processing during the at least one of the one or more elevated usage instances. In response, the system may be configured to receive, via the first user interface, a user selection of at least one of the one or more determined resources. Based on at least receiving the user selection of at least one of the one or more determined resources, the system may be configured to reallocate the one or more determined resources to the user.

In some embodiments, the system may be configured to recommend the use of one or more additional resources for use during the one or more elevated usage instances. For example, the system may determine that the user travels during previous elevated usage instances and in response, recommend a financial instrument (e.g, a credit card) for use during any elevated usage instance scheduled to occur. In some other embodiments, the system may be configured to schedule the reallocation of resource based on information associated with the elevated usage instance. For example, the system may determine that the elevated usage instance is supporting a dependent through his/her undergraduate education. In such cases, the system may be configured to determine that the resources need to be reallocated only for a period of four years and automatically cease reallocation of resources after the four year period has passed.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
|---|---|---|
| 15/176,267, now U.S. Pat. No. 10,178,101 | SYSTEM FOR CREATION OF ALTERNATIVE PATH TO RESOURCE ACQUISITION | Jun. 8, 2016 |
| 15/176,276, now U.S. Pat. No. 10,291,487 | SYSTEM FOR PREDICTIVE ACQUISITION AND USE OF RESOURCES | Jun. 8, 2016 |
| 15/176,478, now U.S. Pat. No. 10,129,126 | SYSTEM FOR PREDICTIVE USAGE OF RESOURCES | Jun. 8, 2016 |

What is claimed is:

1. A system for predictive use of resources across a dispersed Internet protocol capable network connecting devices electrically attached to the network, the system comprising:
at least one memory storing a resource prediction application;
at least one processing device operatively coupled to the at least one memory, wherein the processing device is configured to execute computer-readable program code to:
determine a resource utilization profile associated with a first user, wherein the resource utilization profile comprises usage statistics associated with one or more resources allocated to the user across the dispersed network;
continuously monitor, using a resource monitoring engine, the resource utilization profile of the user to track the use of the one or more resources allocated to the user over a predetermine period of timer;
dynamically generate a graphical interface (GUI) of the resource utilization profile of the first user for display on a first computing device, wherein the GUI comprises information indicating a utilization of the one or more resources of the first user in real-time;
determine one or more elevated usage instances based on at least continuously monitoring the resource utilization profile of the user;
determine a pattern associated with the utilization of the one or more resources by the user based on at least continuously monitoring the one or more resources;
predict, via the resource prediction application, that at least one of the one or more elevated usage instances is scheduled to occur based on at least determining the pattern;
determine a first set of one or more additional resources across the dispersed network for the user for processing during the at least one of the one or more elevated usage instances;
initiate, a first user interface for display on the first computing device, wherein the first user interface comprises one or more target resource utilization profiles associated with one or more users;
receive, via the first user interface, a first user selection of at least one of the one or more target resource utilization profiles associated with the resource utilization profile that the first user wishes to change;

determine one or more access paths associated with the at least one target resource utilization profile to enable the first user to achieve the at least one target utilization profile;

transmit, a second user interface for display on the first user computing device, wherein the second user interface comprises the one or more access paths associated with the at least one target resource utilization profile to enable the first user to achieve the at least one target utilization profile;

receive, via the second user interface, a first user selection of at least one of the one or more access paths to achieve the at least one target utilization profile;

determine a second set of one or more additional resources across the dispersed network to be allocated to the user based on at least the first user selection of the at least one of the one or more access paths, wherein the second set of one or more additional resources are associated with a predetermined threshold authorization level required to access the one or more additional resources;

determine an authorization level associated with an authorization profile of the user;

determine that the authorization level associated with the authorization profile of the user is greater than the predetermined threshold authorization level required to access the first set of one or more additional resources and the second set of one or more additional resources;

reallocate, using a resource reallocation engine, the first set of one or more additional resources and the second set of one or more additional resources to the user based on at least determining that the authorization level associated with the authorization profile of the user is greater than the predetermined threshold level required to access the one or more additional resources;

capture, in real-time, a utilization trend associated with the first set of one or more additional resources and the second set of one or more additional resources for a predetermined amount time after the reallocation of the first set of one or more additional resources and the second set of one or more additional resources to the user;

dynamically generate a GUI of the utilization trend for display on the first computing device; and transmit control signals configured to cause the first computing device to display the GUI of the utilization trend.

2. The system of claim 1, wherein the at least one processing device is further configured to:
receive, via the second user interface, a first user selection of at least one of the one or more access paths to achieve the at least one target utilization profile; and
determine one or more actions associated with the at least one of the one or more access paths to be executed by the first user to enable the first user to achieve the at least one target utilization profile.

3. The system of claim 2, wherein the at least one processing device is further configured to:
initiate a third user interface for display on the first user computing device, wherein the third user interface comprises the one or more actions associated with the at least one of the one or more access paths; and
receive, via the third user interface, a user input indicating an execution of at least one of the one or more actions by the first user associated with the at least one of the one or more access paths to achieve the at least one target utilization profile.

4. The system of claim 3, wherein the at least one processing device is further configured to:
continuously monitor the first user computing device to determine the execution of at least one of the one or more actions by the first user associated with the at least one of the one or more access paths to achieve the at least one target utilization profile.

5. The system of claim 4, wherein the at least one processing device is further configured to:
dynamically generate a graphical representation of the resource utilization profile of the first user reflecting a utilization of one or more resources of the first user in real-time; and
transmit control signals configured to cause the first user computing device to display the graphical representation of the resource utilization profile.

6. The system of claim 5, wherein the at least one processing device is further configured to:
determine a progress level associated with a progress of the first user towards achieving the at least one target utilization profile; and
continuously update the progress level based on at least continuously monitoring the first user computing device to determine the execution of at least one of the one or more actions by the first user associated with the at least one of the one or more access paths.

7. The system of claim 1, wherein the at least one processing device is further configured to:
determine a first user profile associated with the first user;
compare the first user profile associated with the first user with the one or more user profiles associated with the one or more users to determine a match;
determine the one or more target resource utilization profiles associated with one or more users based on at least determining a match between the first user profile and the one or more user profiles associated with the one or more users.

8. A computerized method for predictive use of resources across a dispersed Internet protocol capable network connecting devices electrically attached to the network, the method comprising:
determining, via a computing device processor, a resource utilization profile associated with a first user, wherein the resource utilization profile comprises usage statistics associated with one or more resources allocated to the user across the dispersed network;
continuously monitoring, via a computing device processor, using a resource monitoring engine, the resource utilization profile of the user to track the use of the one or more resources allocated to the user over a predetermine period of time;
dynamically generating, via a computing device processor, a graphical interface (GUI) of the resource utilization profile of the first user for display on a first computing device, wherein the GUI comprises information indicating a utilization of the one or more resources of the first user in real-time;
determining, via a computing device processor, one or more elevated usage instances based on at least continuously monitoring the resource utilization profile of the user;
determining, via a computing device processor, a pattern associated with the utilization of the one or more resources by the user based on at least continuously monitoring the one or more resources;

predicting, via a computing device processor, via a resource prediction application, that at least one of the one or more elevated usage instances is scheduled to occur based on at least determining the pattern;

determining, via a computing device processor, a first set of one or more additional resources across the dispersed network for the user for processing during the at least one of the one or more elevated usage instances;

initiating, via a computing device processor, a first user interface for display on the first computing device, wherein the first user interface comprises one or more target resource utilization profiles associated with one or more users;

receiving, via a computing device processor, via the first user interface, a first user selection of at least one of the one or more target resource utilization profiles associated with the resource utilization profile that the first user wishes to change;

determining, via a computing device processor, one or more access paths associated with the at least one target resource utilization profile to enable the first user to achieve the at least one target utilization profile;

transmitting, via a computing device processor, a second user interface for display on the first user computing device, wherein the second user interface comprises the one or more access paths associated with the at least one target resource utilization profile to enable the first user to achieve the at least one target utilization profile;

receiving, via a computing device processor, via the second user interface, a first user selection of at least one of the one or more access paths to achieve the at least one target utilization profile;

determining, via a computing device processor, a second set of one or more additional resources across the dispersed network to be allocated to the user based on at least the first user selection of the at least one of the one or more access paths, wherein the second set of one or more additional resources are associated with a predetermined threshold authorization level required to access the one or more additional resources;

determining, via a computing device processor, an authorization level associated with an authorization profile of the user;

determining, via a computing device processor, that the authorization level associated with the authorization profile of the user is greater than the predetermined threshold authorization level required to access the first set of one or more additional resources and the second set of one or more additional resources;

reallocating, via a computing device processor, using a resource reallocation engine, the first set of one or more additional resources and the second set of one or more additional resources to the user based on at least determining that the authorization level associated with the authorization profile of the user is greater than the predetermined threshold level required to access the one or more additional resources;

capturing, via a computing device processor, in real-time, a utilization trend associated with the first set of one or more additional resources and the second set of one or more additional resources for a predetermined amount time after the reallocation of the first set of one or more additional resources and the second set of one or more additional resources to the user;

dynamically generating, via a computing device processor, a GUI of the utilization trend for display on the first computing device; and transmitting, via a computing device processor, control signals configured to cause the first computing device to display the GUI of the utilization trend.

9. The method of claim 8, wherein the method further comprises:

receiving, via the second user interface, a first user selection of at least one of the one or more access paths to achieve the at least one target utilization profile; and determining one or more actions associated with the at least one of the one or more access paths to be executed by the first user to enable the first user to achieve the at least one target utilization profile.

10. The method of claim 9, wherein the method further comprises:

initiating a third user interface for display on the first user computing device, wherein the third user interface comprises the one or more actions associated with the at least one of the one or more access paths; and receiving, via the third user interface, a user input indicating an execution of at least one of the one or more actions by the first user associated with the at least one of the one or more access paths to achieve the at least one target utilization profile.

11. The method of claim 10, wherein the method further comprises:

continuously monitoring the first user computing device to determine the execution of at least one of the one or more actions by the first user associated with the at least one of the one or more access paths to achieve the at least one target utilization profile.

12. The method of claim 11, wherein the method further comprises:

dynamically generating a graphical representation of the resource utilization profile of the first user reflecting a utilization of one or more resources of the first user in real-time; and transmit control signals configured to cause the first user computing device to display the graphical representation of the resource utilization profile.

13. The method of claim 12, wherein the method further comprises:

determining a progress level associated with a progress of the first user towards achieving the at least one target utilization profile; and continuously update the progress level based on at least continuously monitoring the first user computing device to determine an execution of at least one of the one or more actions by the first user associated with the at least one of the one or more access paths.

14. The method of claim 8, wherein the method further comprises:

determining a first user profile associated with the first user;

comparing the first user profile associated with the first user with the one or more user profiles associated with the one or more users to determine a match;

determining the one or more target resource utilization profiles associated with one or more users based on at least determining a match between the first user profile and the one or more user profiles associated with the one or more users.

15. A computer program product for predictive use of resources across a dispersed Internet protocol capable network connecting devices electrically attached to the network, the computer program product comprising a non-transitory computer-readable medium comprising code causing a first apparatus to:
determine a resource utilization profile associated with a first user, wherein the resource utilization profile comprises usage statistics associated with one or more resources allocated to the user across the dispersed network;
continuously monitor, using a resource monitoring engine, the resource utilization profile of the user to track the use of the one or more resources allocated to the user over a predetermine period of timer;
dynamically generate a graphical interface (GUI) of the resource utilization profile of the first user for display on a first computing device, wherein the GUI comprises information indicating a utilization of the one or more resources of the first user in real-time;
determine one or more elevated usage instances based on at least continuously monitoring the resource utilization profile of the user;
determine a pattern associated with the utilization of the one or more resources by the user based on at least continuously monitoring the one or more resources;
predict, via a resource prediction application, that at least one of the one or more elevated usage instances is scheduled to occur based on at least determining the pattern;
determine a first set of one or more additional resources across the dispersed network for the user for processing during the at least one of the one or more elevated usage instances;
initiate, a first user interface for display on the first computing device, wherein the first user interface comprises one or more target resource utilization profiles associated with one or more users;
receive, via the first user interface, a first user selection of at least one of the one or more target resource utilization profiles associated with the resource utilization profile that the first user wishes to change;
determine one or more access paths associated with the at least one target resource utilization profile to enable the first user to achieve the at least one target utilization profile;
transmit, a second user interface for display on the first user computing device, wherein the second user interface comprises the one or more access paths associated with the at least one target resource utilization profile to enable the first user to achieve the at least one target utilization profile;
receive, via the second user interface, a first user selection of at least one of the one or more access paths to achieve the at least one target utilization profile;
determine a second set of one or more additional resources across the dispersed network to be allocated to the user based on at least the first user selection of the at least one of the one or more access paths, wherein the second set of one or more additional resources are associated with a predetermined threshold authorization level required to access the one or more additional resources;
determine an authorization level associated with an authorization profile of the user;
determine that the authorization level associated with the authorization profile of the user is greater than the predetermined threshold authorization level required to access the first set of one or more additional resources and the second set of one or more additional resources;
reallocate, using a resource reallocation engine, the first set of one or more additional resources and the second set of one or more additional resources to the user based on at least determining that the authorization level associated with the authorization profile of the user is greater than the predetermined threshold level required to access the one or more additional resources;
capture, in real-time, a utilization trend associated with the first set of one or more additional resources and the second set of one or more additional resources for a predetermined amount time after the reallocation of the first set of one or more additional resources and the second set of one or more additional resources to the user;
dynamically generate a GUI of the utilization trend for display on the first computing device; and
transmit control signals configured to cause the first computing device to display the GUI of the utilization trend.

16. The computer program product of claim 15, wherein the first apparatus is further configured to:
receive, via the second user interface, a first user selection of at least one of the one or more access paths to achieve the at least one target utilization profile; and
determine one or more actions associated with the at least one of the one or more access paths to be executed by the first user to enable the first user to achieve the at least one target utilization profile.

17. The computer program product of claim 16, wherein the first apparatus is further configured to:
initiate a third user interface for display on the first user computing device, wherein the third user interface comprises the one or more actions associated with the at least one of the one or more access paths; and
receive, via the third user interface, a user input indicating an execution of at least one of the one or more actions by the first user associated with the at least one of the one or more access paths to achieve the at least one target utilization profile.

18. The computer program product of claim 17, wherein the first apparatus is further configured to:
continuously monitor the first user computing device to determine the execution of at least one of the one or more actions by the first user associated with the at least one of the one or more access paths to achieve the at least one target utilization profile.

19. The computer program product of claim 17, wherein the first apparatus is further configured to:
dynamically generate a graphical representation of the resource utilization profile of the first user reflecting a utilization of one or more resources of the first user in real-time; and
transmit control signals configured to cause the first user computing device to display the graphical representation of the resource utilization profile.

20. The computer program product of claim 19, wherein the first apparatus is further configured to:
determine a progress level associated with a progress of the first user towards achieving the at least one target utilization profile; and
continuously update the progress level based on at least continuously monitoring the first user computing device to determine an execution of at least one of the one or more actions by the first user associated with the at least one of the one or more access paths.

* * * * *